US012610290B2

(12) United States Patent
Yu et al.

(10) Patent No.: US 12,610,290 B2
(45) Date of Patent: Apr. 21, 2026

(54) METHOD AND DEVICE FOR NON-TERRESTRIAL NETWORK (NTN) NODE SELECTION IN WIRELESS COMMUNICATION

(71) Applicant: Apogee Networks, LLC, Dallas, TX (US)

(72) Inventors: Qiaoling Yu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 696 days.

(21) Appl. No.: 17/557,068

(22) Filed: Dec. 21, 2021

(65) Prior Publication Data

US 2022/0210703 A1    Jun. 30, 2022

(30) Foreign Application Priority Data

Dec. 28, 2020    (CN) .......................... 202011577675.4

(51) Int. Cl.
$H04B\ 7/185$         (2006.01)
$H04W\ 24/10$        (2009.01)
(Continued)

(52) U.S. Cl.
CPC .... H04W 36/0058 (2018.08); H04B 7/18523 (2013.01); H04B 7/1853 (2013.01);
(Continued)

(58) Field of Classification Search
CPC ......... H04W 36/0058; H04W 36/0061; H04W 36/0083; H04W 36/00835;
(Continued)

(56) References Cited

U.S. PATENT DOCUMENTS

| 11,102,669 B2 * | 8/2021 | Tsuboi .................. H04W 76/16 |
| 2009/0239533 A1 * | 9/2009 | Somasundaram .... H04W 48/16 |
| | | 455/434 |

(Continued)

FOREIGN PATENT DOCUMENTS

| AU | 2009332075 B2 * | 5/2014 | ............. H04B 17/24 |
| CN | 103313301 A | 9/2013 | |

(Continued)

OTHER PUBLICATIONS

R2-2009454, "Cell Selection and Reselection enhancements", Nov. 2-13, 2020, pp. 1-3 (Year: 2020).*

(Continued)

*Primary Examiner* — Salvadore E Rivas
(74) *Attorney, Agent, or Firm* — Volpe Koenig

(57) ABSTRACT

A method and a device used in communication node for wireless communications. A communication node performs a first-type measurement, the first-type measurement being used to determine a first measurement result and a second measurement result; transmits a first message, the first message comprising the first measurement result and the second measurement result; the first measurement result is associated with a first cell, while the second measurement result is associated with a second cell, the first cell and the second cell are respectively two different cells; at least one of a cell parameter of the first cell or a cell parameter of the second cell is used to determine an order of how the first measurement result and the second measurement result are arranged in the first message; the cell parameter comprises at least one of a cell type, a cell height, or a cell orbit or a cell delay.

14 Claims, 5 Drawing Sheets

(51) Int. Cl.
    *H04W 36/00*          (2009.01)
    *H04W 84/06*          (2009.01)

(52) U.S. Cl.
    CPC ..... *H04B 7/18576* (2013.01); *H04B 7/18578*
        (2013.01); *H04W 24/10* (2013.01); *H04W*
        *36/0094* (2013.01); *H04B 7/18513* (2013.01);
        *H04W 84/06* (2013.01)

(58) Field of Classification Search
    CPC ....... H04W 36/00837; H04W 36/0085; H04W
        36/0088; H04W 36/0094; H04W 24/10;
        H04W 84/06; H04B 7/1853; H04B
        7/18513; H04B 7/18523
    See application file for complete search history.

(56)                References Cited

U.S. PATENT DOCUMENTS

| | | | | |
|---|---|---|---|---|
| 2010/0173610 A1* | 7/2010 | Kitazoe | ............ | H04W 12/0431 |
| | | | | 455/411 |
| 2010/0208707 A1* | 8/2010 | Hamabe | ................ | H04W 24/10 |
| | | | | 370/332 |
| 2012/0176925 A1* | 7/2012 | Hwang | ................ | H04W 24/10 |
| | | | | 370/252 |
| 2013/0308481 A1* | 11/2013 | Kazmi | .................. | H04W 24/02 |
| | | | | 370/252 |
| 2015/0148039 A1* | 5/2015 | Yang | ................ | H04W 36/0085 |
| | | | | 455/436 |
| 2016/0020890 A1* | 1/2016 | Sirotkin | ................ | H04W 76/22 |
| | | | | 370/352 |
| 2016/0345217 A1* | 11/2016 | Tabet | ................ | H04W 36/0085 |
| 2016/0353292 A1* | 12/2016 | Centonza | .......... | H04W 36/0088 |
| 2018/0063735 A1* | 3/2018 | Raghunathan | ........ | H04W 24/08 |
| 2018/0124612 A1* | 5/2018 | Babaei | .................. | H04W 72/23 |
| 2019/0082392 A1* | 3/2019 | Balasubramanian | ........................ | |
| | | | | G06F 1/3278 |
| 2019/0150014 A1* | 5/2019 | Virtej | .................... | H04W 76/27 |
| | | | | 370/329 |
| 2020/0068422 A1* | 2/2020 | Wang | .................... | H04B 7/0456 |
| 2021/0329514 A1* | 10/2021 | Chin | ............. | H04W 36/008375 |
| 2022/0117022 A1* | 4/2022 | Cheng | .................... | H04W 76/19 |
| 2023/0007523 A1* | 1/2023 | Fu | ...................... | H04B 7/18504 |
| 2023/0189033 A1* | 6/2023 | Agarwal | ............... | H04L 5/0028 |
| | | | | 370/329 |
| 2023/0308958 A1* | 9/2023 | Dong | ................ | H04W 36/0058 |

FOREIGN PATENT DOCUMENTS

| | | | | | |
|---|---|---|---|---|---|
| CN | 111108764 | A | | 5/2020 | |
| EP | 2944129 | B1 * | 9/2018 | ............ | H04W 24/10 |
| WO | WO-2009019129 | A1 * | 2/2009 | ............ | H04W 24/08 |
| WO | WO-2013023171 | A1 * | 2/2013 | ........ | H04W 36/0061 |
| WO | 2014017810 | A1 | | 1/2014 | |
| WO | 2014110816 | A1 | | 7/2014 | |
| WO | 2019064258 | A1 | | 4/2019 | |
| WO | 2020229445 | A1 | | 11/2020 | |
| WO | WO-2021102184 | A2 * | 5/2021 | ........ | H04W 36/0058 |

OTHER PUBLICATIONS

R2-2008897, "On Cell Re-selection in NR-NTN", Nov. 2-13, 2020, pp. 1-4 (Year: 2020).*
R2-2009804, "Consideration on the measurement configuration and reporting in NTN", Nov. 2-13, 2020, pp. 1-10 (Year: 2020).*
R2-2009510, "Cell Selection and Reselection Solutions for NTN Networks", Nov. 2-13, 2020, pp. 1-6 (Year: 2020).*
R2-1912157, "Measurement Issues for NTN Systems", Oct. 14-18, 2019,pp. 1-9 (Year: 2019).*
First Office Action of Chinese patent application No. CN202011577675.4 dated Dec. 9, 2024.
First Search Report of Chinese patent application No. CN202011577675.4 dated Dec. 3, 2024.
Thales et al., "Study on NR to support Non-Terrestrial Networks," 3GPP TSG RAN WG1 Meeting 88bis, RP-171450, West Palm Beach, USA (Jun. 5-9, 2017).
Third Generation Partnership Project, "Technical Specification Group Radio Access Network; NR; Physical channels and modulation (Release 16)," 3GPP TS 38.211 V16.3.0 (Sep. 2020).
Third Generation Partnership Project, "Technical Specification Group Radio Access Network; NR; Multiplexing and channel coding (Release 16)," 3GPP TS 38.212 V16.3.0 (Sep. 2020).
Third Generation Partnership Project, "Technical Specification Group Radio Access Network; NR; Physical layer procedures for control (Release 16)," 3GPP TS 38.213 V16.3.0 (Sep. 2020).
Third Generation Partnership Project, "Technical Specification Group Radio Access Network; NR; Physical layer procedures for data (Release 16)," 3GPP TS 38.214 V16.3.0 (Sep. 2020).
Third Generation Partnership Project, "Technical Specification Group Radio Access Network; NR; NR and NG-RAN Overall Description; Stage 2 (Release 16)," 3GPP TS 38.300 V16.3.0 (Sep. 2020).

* cited by examiner

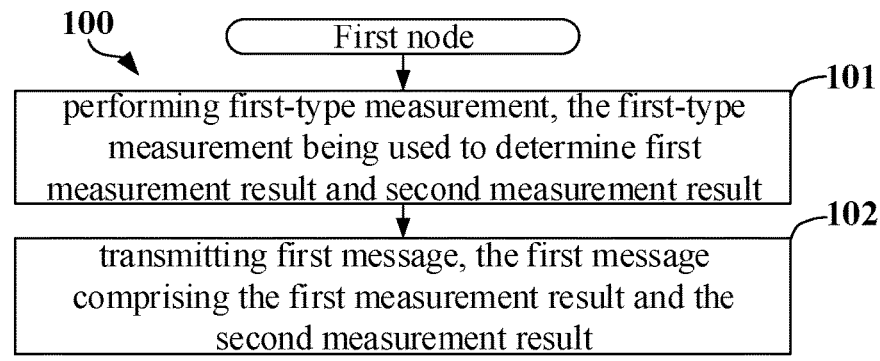
100
First node
performing first-type measurement, the first-type measurement being used to determine first measurement result and second measurement result ⌐101
transmitting first message, the first message comprising the first measurement result and the second measurement result ⌐102
FIG. 1
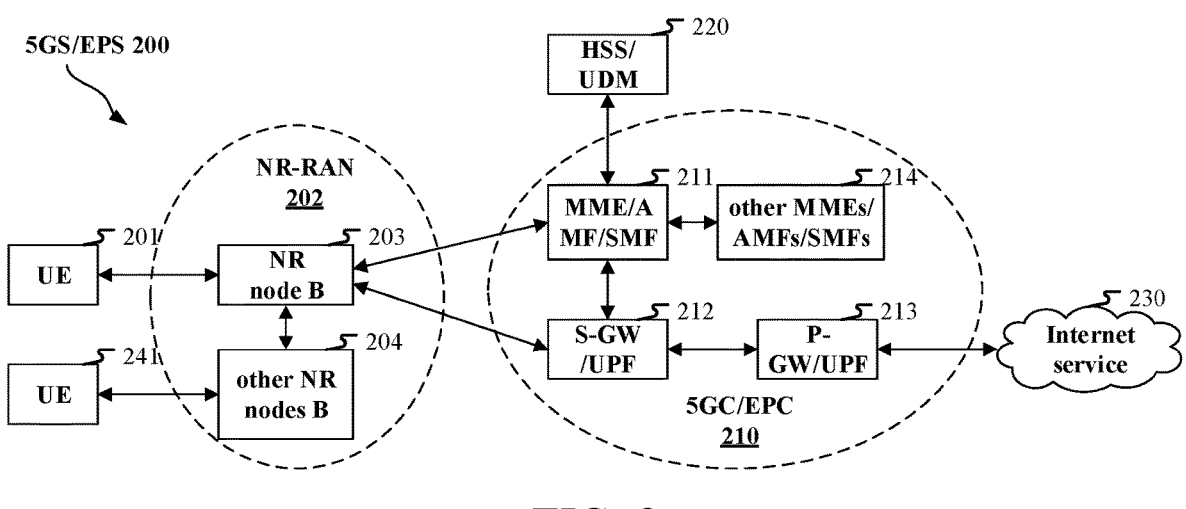
FIG. 2
FIG. 3

900

First message

-- ASN1START
-- TAG-first message-START

...
first message ::=      first structural type{

...
first list      values in first list

...
second list      values in second list

...
}

...
-- TAG-first message-STOP
-- ASN1STOP

METHOD AND DEVICE FOR NON-TERRESTRIAL NETWORK (NTN) NODE SELECTION IN WIRELESS COMMUNICATION

CROSS REFERENCE TO RELATED APPLICATIONS

This application claims the priority benefit of Chinese Patent Application No. 202011577675.4, filed on Dec. 28, 2020, the full disclosure of which is incorporated herein by reference.

BACKGROUND

Technical Field

The present disclosure relates to transmission methods and devices in wireless communication systems, and in particular to a method and a device for large-delay transmission.

Related Art

With the communications requests becoming more extensive and demanding, the 3rd Generation Partner Project (3GPP) kicks off studies on Non-Terrestrial Network (NTN), and at the 3GPP RAN #80 conference it was decided that a study item (SI) of solutions to New Radio (NR)-supported NTN shall be conducted, as a continuity of the previously proposed NR-supported NTN SI (RP-171450). Herein the mobility of NTN is an important focus of studies.

SUMMARY

Performing reference signal measurements and reporting measurement results are both crucial procedures of mobility. In Terrestrial Network (TN), measurement results are arranged according to sorting quantities, which are related to measurements for reference signals, while in NTN, there isn't much difference between a result of measurement for a reference signal in the cell center and that in the cell edge by a User Equipment (UE), which makes it harder to reflect the link quality exactly, so, using the TN-applicable sorting rule for measurement results in the NTN won't precisely reflect a best cell, which in turn results in a base station's failing to perform a next step most desirable, thus influencing the UE's serving quality.

To address the above problem, the present disclosure provides a solution. The statement above only took NTN and NR scenarios for example, though; The present disclosure is also applicable to scenarios in NTN and LIE, where similar technical effects can be achieved, for names of each message, or IE, or field in LIE, refer to definitions given in TS36 series. Additionally, the adoption of a unified solution for various scenarios contributes to the reduction of hardcore complexity and costs.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

It should be noted that if no conflict is incurred, embodiments in any node in the present disclosure and the characteristics of the embodiments are also applicable to any other node, and vice versa. What's more, the embodiments in the present disclosure and the characteristics in the embodiments can be arbitrarily combined if there is no conflict.

The present disclosure provides a method in a first node for wireless communications, comprising:

performing a first-type measurement, the first-type measurement being used to determine a first measurement result and a second measurement result; and transmitting a first message, the first message comprising the first measurement result and the second measurement result;

herein, the first measurement result is associated with a first cell, while the second measurement result is associated with a second cell, the first cell and the second cell are respectively two different cells, and a RAT adopted by the first cell is the same as a RAT adopted by the second cell; the first message comprises a measurement report; at least one of a cell parameter of the first cell or a cell parameter of the second cell is used to determine an order of how the first measurement result and the second measurement result are arranged in the first message; the cell parameter comprises at least one of a cell type, a cell height, or a cell orbit or a cell delay.

In one embodiment, a problem to be solved in the present disclosure includes: how to improve the accuracy of NTN-related measurement reports.

In one embodiment, a problem to be solved in the present disclosure includes: how to optimize NTN-related measurement reports.

In one embodiment, a problem to be solved in the present disclosure includes: how to design a sorting rule for NTN-related measurement reports.

In one embodiment, characteristics of the above method include: an order of arrangement of measurement results of different cells in a measurement report depends on the cell parameter.

In one embodiment, characteristics of the above method include: a sorting rule for measurement results in NTN differs from that in TN.

In one embodiment, characteristics of the above method include: a sorting rule is determined according to the cell parameter.

In one embodiment, an advantage of the above method includes: improving the accuracy of NTN-related measurement reports.

In one embodiment, an advantage of the above method includes: optimizing a sorting rule for NTN-related measurement reports.

In one embodiment, an advantage of the above method includes: enhancing the mobility robustness.

In one embodiment, an advantage of the above method includes: decreasing the rate of Handover Failure (HOF).

According to one aspect of the present disclosure, characterized in comprising:

receiving a first signaling; receiving a first reference signal in the first cell, and receiving a second reference signal in the second cell; a measurement for the first reference signal according to a first measurement quantity set is used to determine the first measurement result, while a measurement for the second reference signal according to the first measurement quantity set is used to determine the second measurement result;

herein, the first signaling indicates the first measurement quantity set, the first-type measurement being associated with the first measurement quantity set; the first measurement quantity set is used to determine the order of how the first measurement result and the second measurement result are arranged in the first message; the first measurement quantity set is related to signal quality.

In one embodiment, according to one aspect of the present disclosure, characterized in comprising: receiving a first signaling; receiving a first reference signal in the first cell, and receiving a second reference signal in the second cell; a measurement for the first reference signal according to a first measurement quantity set is used to determine the first measurement result, while a measurement for the second reference signal according to the first measurement quantity set is used to determine the second measurement result; herein, the first signaling indicates the first measurement quantity set, the first-type measurement being associated with the first measurement quantity set; the first measurement quantity set is related to signal quality.

In one embodiment, according to one aspect of the present disclosure, characterized in that the first measurement quantity set is used to determine the order of how the first measurement result and the second measurement result are arranged in the first message.

According to one aspect of the present disclosure, characterized in comprising:

receiving a second signaling; determining first measurement information according to a second measurement quantity set, and determining second measurement information according to the second measurement quantity set;

herein, the second signaling indicates the second measurement quantity set, the first-type measurement being associated with the second measurement quantity set; the first measurement information is associated with the first cell, while the second measurement information is associated with the second cell; the second measurement quantity set is used to determine the order of how the first measurement result and the second measurement result are arranged in the first message; the second measurement quantity set is unrelated to signal quality.

In one embodiment, according to one aspect of the present disclosure, characterized in comprising: receiving a second signaling; determining first measurement information according to a second measurement quantity set, and determining second measurement information according to the second measurement quantity set; herein, the second signaling indicates the first measurement quantity set, the first-type measurement being associated with the second measurement quantity set; the first measurement information is associated with the first cell, while the second measurement information is associated with the second cell; the second measurement quantity set is unrelated to signal quality.

In one embodiment, according to one aspect of the present disclosure, characterized in that the second measurement quantity set is used to determine the order of how the first measurement result and the second measurement result are arranged in the first message.

According to one aspect of the present disclosure, characterized in that a cell priority is used to determine the order of how the first measurement result and the second measurement result are arranged in the first message; the cell priority is related to the cell parameter.

According to one aspect of the present disclosure, characterized in that the cell parameter of a first serving cell is used to determine the order of how the first measurement result and the second measurement result are arranged in the first message.

According to one aspect of the present disclosure, characterized in comprising:

receiving a third signaling, the third signaling comprising a first threshold, the first threshold being related to the first measurement quantity set; the first measurement result and the second measurement result fulfill the first threshold.

According to one aspect of the present disclosure, characterized in comprising:

receiving a fourth signaling, the fourth signaling comprising a second threshold, the second threshold being related to the second measurement quantity set; the first measurement result and the second measurement result fulfill the second threshold.

According to one aspect of the present disclosure, characterized in comprising:

transmitting a second message, the second message being used to indicate the cell priority, and the second message comprising an RRC message.

The present disclosure provides a method in a second node for wireless communications, comprising:

receiving a first message, the first message comprising a first measurement result and a second measurement result;

herein, a first-type measurement is performed, the first-type measurement being used to determine the first measurement result and the second measurement result; the first measurement result is associated with a first cell, while the second measurement result is associated with a second cell, the first cell and the second cell are respectively two different cells, and a RAT adopted by the first cell is the same as a RAT adopted by the second cell; the first message comprises a measurement report; at least one of a cell parameter of the first cell or a cell parameter of the second cell is used to determine an order of how the first measurement result and the second measurement result are arranged in the first message; the cell parameter comprises at least one of a cell type, a cell height, or a cell orbit or a cell delay.

According to one aspect of the present disclosure, characterized in comprising:

transmitting a first signaling;

herein, a first reference signal is received in the first cell, while a second reference signal is received in the second cell; a measurement for the first reference signal according to a first measurement quantity set is used to determine the first measurement result, while a measurement for the second reference signal according to the first measurement quantity set is used to determine the second measurement result; the first signaling indicates the first measurement quantity set, the first-type measurement being associated with the first measurement quantity set; the first measurement quantity set is used to determine the order of how the first measurement result and the second measurement result are arranged in the first message; the first measurement quantity set is related to signal quality.

In one embodiment, according to one aspect of the present disclosure, characterized in comprising: transmitting a first signaling; herein, a first reference signal is received in the first cell, while a second reference signal is received in the second cell; a measurement for the first reference signal according to a first measurement quantity set is used to determine the first measurement result, while a measurement for the second reference signal according to the first measurement quantity set is used to determine the second measurement result; the first signaling indicates the first measurement quantity set, the first-type measurement being associated with the first measurement quantity set; the first measurement quantity set is related to signal quality.

In one embodiment, the first measurement quantity set is used to determine the order of how the first measurement result and the second measurement result are arranged in the first message.

According to one aspect of the present disclosure, characterized in comprising:

transmitting a second signaling;

herein, according to a second measurement quantity set first measurement information is determined, and according to a second measurement quantity set second measurement information is determined; the second signaling indicates the second measurement quantity set, the first-type measurement being associated with the second measurement quantity set; the first measurement information is associated with the first cell, while the second measurement information is associated with the second cell; the second measurement quantity set is used to determine the order of how the first measurement result and the second measurement result are arranged in the first message; the second measurement quantity set is unrelated to signal quality.

In one embodiment, according to one aspect of the present disclosure, characterized in comprising: transmitting a second signaling; herein, according to a second measurement quantity set first measurement information is determined, and according to a second measurement quantity set second measurement information is determined; the second signaling indicates the second measurement quantity set, the first-type measurement being associated with the second measurement quantity set; the first measurement information is associated with the first cell, while the second measurement information is associated with the second cell; the second measurement quantity set is unrelated to signal quality.

In one embodiment, the second measurement quantity set is used to determine the order of how the first measurement result and the second measurement result are arranged in the first message.

According to one aspect of the present disclosure, characterized in that a cell priority is used to determine the order of how the first measurement result and the second measurement result are arranged in the first message; the cell priority is related to the cell parameter.

According to one aspect of the present disclosure, characterized in that the cell parameter of a first serving cell is used to determine the order of how the first measurement result and the second measurement result are arranged in the first message.

According to one aspect of the present disclosure, characterized in comprising:

transmitting a third signaling, the third signaling comprising a first threshold, the first threshold being related to the first measurement quantity set; the first measurement result and the second measurement result fulfill the first threshold.

According to one aspect of the present disclosure, characterized in comprising:

transmitting a fourth signaling, the fourth signaling comprising a second threshold, the second threshold being related to the second measurement quantity set; the first measurement result and the second measurement result fulfill the second threshold.

According to one aspect of the present disclosure, characterized in comprising:

receiving a second message, the second message being used to indicate the cell priority, and the second message comprising an RRC message.

The present disclosure provides a first node for wireless communications, comprising:

a first receiver, performing a first-type measurement, the first-type measurement being used to determine a first measurement result and a second measurement result; and a first transmitter, transmitting a first message, the first message comprising the first measurement result and the second measurement result;

herein, the first measurement result is associated with a first cell, while the second measurement result is associated with a second cell, the first cell and the second cell are respectively two different cells, and a RAT adopted by the first cell is the same as a RAT adopted by the second cell; the first message comprises a measurement report; at least one of a cell parameter of the first cell or a cell parameter of the second cell is used to determine an order of how the first measurement result and the second measurement result are arranged in the first message; the cell parameter comprises at least one of a cell type, a cell height, or a cell orbit or a cell delay.

The present disclosure provides a second node for wireless communications, comprising:

a second receiver, receiving a first message, the first message comprising a first measurement result and a second measurement result;

herein, a first-type measurement is performed, the first-type measurement being used to determine the first measurement result and the second measurement result; the first measurement result is associated with a first cell, while the second measurement result is associated with a second cell, the first cell and the second cell are respectively two different cells, and a RAT adopted by the first cell is the same as a RAT adopted by the second cell; the first message comprises a measurement report; at least one of a cell parameter of the first cell or a cell parameter of the second cell is used to determine an order of how the first measurement result and the second measurement result are arranged in the first message; the cell parameter comprises at least one of a cell type, a cell height, or a cell orbit or a cell delay.

In one embodiment, compared with the prior art, the present disclosure is advantageous in the following aspects:

increasing the accuracy of measurement reports related to NTN;

optimizing the sorting rule for measurement reports related to NTN;

enhancing the robustness of mobility;

reducing the chance of handover failure.

BRIEF DESCRIPTION OF THE DRAWINGS

Other features, objects and advantages of the present disclosure will become more apparent from the detailed description of non-restrictive embodiments taken in conjunction with the following drawings:

FIG. 1 illustrates a flowchart of transmission of a first message according to one embodiment of the present disclosure.

FIG. 2 illustrates a schematic diagram of a network architecture according to one embodiment of the present disclosure.

FIG. 3 illustrates a schematic diagram of a radio protocol architecture of a user plane and a control plane according to one embodiment of the present disclosure.

DESCRIPTION OF THE EMBODIMENTS

Figure 4:
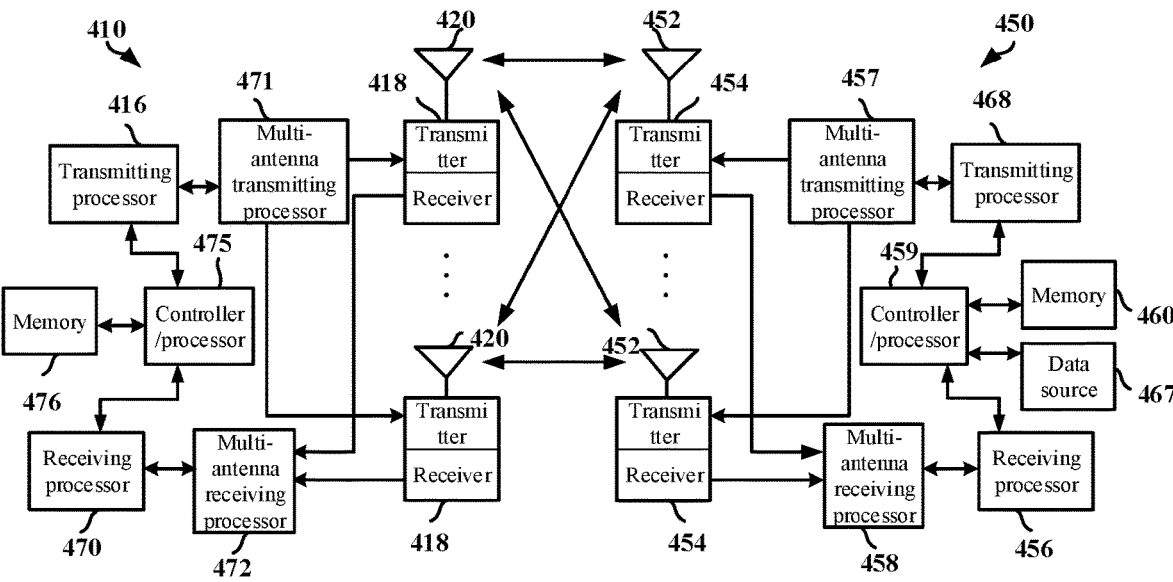
FIG. 4 illustrates a schematic diagram of a first communication device and a second communication device according to one embodiment of the present disclosure.

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Embodiment 1 illustrates a flowchart of transmission of a first message according to one embodiment of the present disclosure, as shown in FIG. 1. In FIG. 1, each step represents a step, it should be particularly noted that the sequence order of each box herein does not imply a chronological order of steps marked respectively by these boxes.

In Embodiment 1, the first node in the present disclosure performs a first-type measurement in step 101, the first-type measurement being used to determine a first measurement result and a second measurement result; and transmits a first message in step 102, the first message comprising the first measurement result and the second measurement result; herein, the first measurement result is associated with a first cell, while the second measurement result is associated with a second cell, the first cell and the second cell are respectively two different cells, and a RAT adopted by the first cell is the same as a RAT adopted by the second cell; the first message comprises a measurement report; at least one of a cell parameter of the first cell or a cell parameter of the second cell is used to determine an order of how the first measurement result and the second measurement result are arranged in the first message; the cell parameter comprises at least one of a cell type, a cell height, or a cell orbit or a cell delay.

In one embodiment, the action of performing a first-type measurement comprises: performing a measurement of a Reference Signal Received Power (RSRP).

In one embodiment, the action of performing a first-type measurement comprises: performing a measurement of a Reference Signal Received Quality (RSRQ).

In one embodiment, the action of performing a first-type measurement comprises: performing a measurement of a Signal to Noise and Interference Ratio (SINR).

In one embodiment, the action of performing a first-type measurement comprises: performing a measurement of a Channel Status Information reference signal resource indicator (CRI).

In one embodiment, the action of performing a first-type measurement comprises: performing a measurement of a Channel Busy Ratio (CBR).

In one embodiment, the action of performing a first-type measurement comprises: performing a positional measurement.

In one embodiment, the action of performing a first-type measurement comprises: performing a time measurement.

In one embodiment, the action of performing a first-type measurement comprises: performing an intra-RAT measurement.

In one embodiment, the action of performing a first-type measurement comprises: performing an inter-RAT measurement.

In one embodiment, the action of performing a first-type measurement comprises: performing a measurement of a serving cell.

In one embodiment, the action of performing a first-type measurement comprises: performing a measurement of a neighboring cell.

In one embodiment, the action of performing a first-type measurement comprises: performing a measurement of a Received Signal Strength Indicator (RSSI) and a Channel Occupancy measurement.

In one embodiment, the action of performing a first-type measurement comprises: performing a measurement of a SFN (i.e., System Frame Number) and Frame Timing Difference (SFTD) between a PCell and a PSCell.

In one embodiment, the action of performing a first-type measurement comprises: performing one or more of the above-mentioned measurements.

In one embodiment, the first-type measurement comprises a periodical measurement.

In one embodiment, the first-type measurement comprises an eventTriggered measurement.

In one embodiment, the first-type measurement comprises a condTriggerConfig measurement.

In one embodiment, the first-type measurement comprises an Intra-RAT measurement, where RAT refers to Radio Access Technology.

In one embodiment, the first-type measurement comprises an Inter-RAT measurement.

In one embodiment, the first-type measurement comprises a measurement of Layer 1 (L1).

In one embodiment, the first-type measurement comprises a measurement of Layer 3 (L3).

In one subembodiment, the measurement of L3 adopts a Measurement Model in Section 9.2.4 of 3GPP TS 38.300.

In one subembodiment, the measurement of L3 comprises L3 filtering.

In one subembodiment, the measurement of L3 is used to determine Cell Quality.

In one embodiment, the first-type measurement is performed according to measurement configuration.

In one subembodiment, the measurement configuration is indicated by an Information Element (IE) in a Radio Resource Control (RRC) message, and names of the IE include at least one of MeasConfig.

In one subembodiment, the measurement configuration is associated with a measurement identifier, the measurement identifier being indicated by a measId.

In one embodiment, the first-type measurement comprises a measurement for (a) given measurement quantity(quantities).

In one subembodiment, the given measurement quantity (quantities) includes(include) at least one measurement quantity in the first measurement quantity set in the present disclosure.

In one subembodiment, the given measurement quantity (quantities) includes(include) at least one measurement quantity in the second measurement quantity set in the present disclosure.

In one subembodiment, the given measurement quantities include the first measurement quantity set and the second measurement quantity set in the present disclosure.

In one subembodiment, the given measurement quantities include at least one measurement quantity in the first measurement quantity set and at least one measurement quantity in the second measurement quantity set in the present disclosure.

In one embodiment, the first-type measurement comprises a measurement of a given reference signal.

In one subembodiment, the given reference signal includes the first reference signal in the present disclosure.

In one subembodiment, the given reference signal includes the second reference signal in the present disclosure.

In one subembodiment, the given reference signal includes a positioning reference signal.

In one subembodiment, the given reference signal includes a GNSS signal.

In one embodiment, the first-type measurement comprises determining the cell parameter.

In one embodiment, the first-type measurement comprises determining a cell type.

In one embodiment, the first-type measurement comprises determining a cell height.

In one embodiment, the first-type measurement comprises determining a cell orbit.

In one embodiment, the first-type measurement comprises determining a cell delay.

In one embodiment, the first-type measurement comprises determining a cell ephemeris.

In one embodiment, the first-type measurement comprises determining time.

In one embodiment, the first-type measurement is performed for a measured object.

In one subembodiment, the measured object is indicated by an IE in an RRC message, and names of the IE include measObject.

In one subembodiment, the measured object is used to determine frequency of measurement.

In one embodiment, the phrase that the first-type measurement is used to determine a first measurement result and a second measurement result comprises: the first measurement result and the second measurement result are obtained by performing the first-type measurement.

In one embodiment, the phrase that the first-type measurement is used to determine a first measurement result and a second measurement result comprises: performing the first-type measurement to determine the first measurement result and the second measurement result.

In one embodiment, the phrase that the first-type measurement is used to determine a first measurement result and a second measurement result comprises: measurement results obtained by performing the first-type measurement comprise the first measurement result and the second measurement result.

In one embodiment, the first message is transmitted via an air interface.

In one embodiment, the first message is transmitted via an antenna port.

In one embodiment, the first message is an Uplink (UL) signal.

In one embodiment, the first message is a Sidelink (SL) signal.

In one embodiment, the first message comprises an RRC message.

In one embodiment, the first message comprises a MeasurementReport.

In one embodiment, the Measurement Report comprises measurement results.

In one embodiment, the Measurement Report comprises a cell identifier of a serving cell.

In one embodiment, the Measurement Report comprises a cell identifier of a neighboring cell.

In one embodiment, the Measurement Report comprises a measurement identifier.

In one embodiment, the first message comprises one IE in an RRC message, and names of the IE include at least one of MeasResults, or MeasResult2EUTRA, MeasResult2NR, or MeasResultIdleEUTRA, or MeasResultSCG-Failure or MeasResultsSL.

In one embodiment, the first message comprises one field in an RRC message, and names of the field include at least one of measId, or measResultNeighCells, or MeasResult-ServMOList, or MeasResultListNR, or MeasResultListEUTRA, or MeasResultListUTRA-FDD, or servCellId, or measResult, or MeasQuantityResults, or MeasQuantityResultsEUTRA, or ResultsPerSSB-Index, or MeasResultForRSSI, or MeasQuantityResultsEUTRA-NTN or MeasResultListNR-NTN.

In one embodiment, the first message comprises one field in an RRC message, and names of the field include at least one of utra-FDD-RSCP, or utra-FDD-EcN0, or rsrp, or rsrq, or sinr, or srs-RSRP-Result.

In one embodiment, the first message comprises one field in an RRC message, and names of the field include at least one of NTN, or MeasResult, or Quantity, or NR, or EUTRA or List.

In one embodiment, the phrase that the first message comprises the first measurement result and the second measurement result comprises: the first measurement result and the second measurement result are respectively fields comprised in the first message.

In one embodiment, the phrase that the first message comprises the first measurement result and the second measurement result comprises: the first measurement result and the second measurement result are respectively two fields in a same field comprised in the first message.

In one embodiment, the phrase that the first message comprises the first measurement result and the second measurement result comprises: the first measurement result and the second measurement result are respectively two fields in different fields comprised in the first message.

In one embodiment, the phrase that the first message comprises the first measurement result and the second measurement result comprises: the first measurement result and the second measurement result are in a same measurement result list in the first message.

In one embodiment, the phrase that the first message comprises the first measurement result and the second measurement result comprises: the first measurement result and the second measurement result are in two different measurement result lists in the first message.

In one embodiment, the phrase that the first measurement result is associated with a first cell comprises: the first measurement result is a measurement result obtained by performing the first-type measurement on the first cell.

In one embodiment, the phrase that the first measurement result is associated with a first cell comprises: the first measurement result is a measurement result of the first cell.

In one embodiment, the phrase that the second measurement result is associated with a second cell comprises: the second measurement result is a measurement result obtained by performing the first-type measurement on the second cell.

In one embodiment, the phrase that the second measurement result is associated with a second cell comprises: the second measurement result is a measurement result of the second cell.

In one embodiment, the phrase that the first cell and the second cell are respectively two different cells comprises: the first cell and the second cell have different Physical Cell Identities (PCIs).

In one embodiment, the phrase that the first cell and the second cell are respectively two different cells comprises: the first cell and the second cell have different beam identifiers.

In one embodiment, the phrase that the first cell and the second cell are respectively two different cells comprises: the first cell and the second cell have different reference signals, which include the first reference signal and the second reference signal in the present disclosure.

In one embodiment, the phrase that the first cell and the second cell are respectively two different cells comprises: the first cell and the second cell belong to two different TRPs.

In one embodiment, the phrase that the first cell and the second cell are respectively two different cells comprises: the first cell and the second cell belong to two different Centralized Units (CUs).

In one embodiment, the phrase that the first cell and the second cell are respectively two different cells comprises: the first cell and the second cell belong to two different Distributed Units (DUs).

In one embodiment, the first cell and the second cell are associated with a same base station or a same Gate Way.

In one embodiment, the first cell and the second cell are associated with different base stations or different GateWays.

In one embodiment, the first cell and the second cell are associated with different beams of a same base station.

In one embodiment, the first cell and the second cell are associated with different beams of different base stations.

In one embodiment, the phrase that a RAT adopted by the first cell is the same as that adopted by the second cell comprises: the first cell and the second cell adopt a same RAT.

In one embodiment, the phrase that a RAT adopted by the first cell is the same as that adopted by the second cell comprises: a RAT of the first cell and a RAT of the second cell are the same.

In one embodiment, the phrase that a RAT adopted by the first cell is the same as that adopted by the second cell comprises: a RAT to which the first cell belongs and a RAT to which the second cell belongs are the same.

In one embodiment, the phrase that a RAT adopted by the first cell is the same as that adopted by the second cell comprises: the first cell is an NR cell, and the second cell is an NR cell.

In one embodiment, the phrase that a RAT adopted by the first cell is the same as that adopted by the second cell comprises: the first cell is an LIE cell, and the second cell is an LIE cell.

In one embodiment, the phrase that a RAT adopted by the first cell is the same as that adopted by the second cell comprises: the first cell is a Universal Land Wireless Access (UTRA) cell, and the second cell is a UTRA cell.

In one embodiment, the phrase that a RAT adopted by the first cell is the same as that adopted by the second cell comprises: the first cell is an E-UTRA cell, and the second cell is an E-UTRA cell.

In one embodiment, the phrase that a RAT adopted by the first cell is the same as that adopted by the second cell comprises: the first cell is a UTRA-FDD cell, and the second cell is a UTRA-FDD cell.

In one embodiment, the serving cell in the present disclosure comprises a cell in a Master Cell Group (MCG).

In one embodiment, the serving cell in the present disclosure comprises a cell in a Secondary Cell Group (SCG).

In one embodiment, the serving cell in the present disclosure comprises a SCell.

In one embodiment, the serving cell in the present disclosure comprises a Special Cell (SpCell).

In one subembodiment, the SpCell comprises a Primary Cell (PCell).

In one subembodiment, the SpCell comprises a Primary SCG Cell (PSCell).

In one embodiment, the serving cell in the present disclosure comprises a Source Cell.

In one embodiment, there is an overlapping coverage between the neighboring cell and the serving cell in the present disclosure.

In one embodiment, there isn't an overlapping coverage between the neighboring cell and the serving cell in the present disclosure.

In one embodiment, there is an Xn or X2 interface between the neighboring cell and the serving cell in the present disclosure.

In one embodiment, there isn't an Xn or X2 interface between the neighboring cell and the serving cell in the present disclosure.

In one embodiment, the neighboring cell and the serving cell in the present disclosure can be detected by a same user.

In one embodiment, the neighboring cell in the present disclosure comprises a neighbouring cell.

In one embodiment, the neighboring cell in the present disclosure comprises a neighbour cell.

In one embodiment, the neighboring cell in the present disclosure comprises a Neighboring cell.

In one embodiment, the neighboring cell in the present disclosure comprises a Neighbor cell.

In one embodiment, the neighboring cell in the present disclosure comprises a Target Cell.

In one embodiment, the first cell is a serving cell.

In one embodiment, the first cell is a neighbor cell of a serving cell of the first node.

In one embodiment, the first cell is a detected cell.

In one embodiment, the first cell is a listed cell.

In one embodiment, the second cell is a serving cell.

In one embodiment, the second cell is a neighbor cell of a serving cell of the first node.

In one embodiment, the second cell is a detected cell.

In one embodiment, the second cell is a listed cell.

In one embodiment, neither the first cell nor the second cell is a serving cell of the first node.

In one embodiment, at least one of the first cell or the second cell is a serving cell of the first node.

In one embodiment, both the first cell and the second cell are neighboring cells of a serving cell of the first node.

In one embodiment, at least one of the first cell or the second cell is a listed cell, the listed cell being a cell in a measurement object.

In one embodiment, at least one of the first cell or the second cell is a detected cell, the detected cell not being a cell in a measurement object, the detected cell being detected by the first node.

In one subembodiment, the detected cell is detected on a Synchronization Signal Block (SSB) frequency indicated by a measurement object.

In one subembodiment, the detected cell is detected on a Subcarrier Spacing indicated by a measurement object.

In one subembodiment, the detected cell is detected on an SSB frequency and a Subcarrier Spacing indicated by a measurement object.

In one embodiment, the first cell is a cell in a cellsTriggeredList.

In one embodiment, the first cell is not a cell in a cellsTriggeredList.

In one embodiment, the second cell is a cell in a cellsTriggeredList.

In one embodiment, the second cell is not a cell in a cellsTriggeredList.

In one embodiment, the first cell is a cell that satisfies a said first-type event, and the second cell is another cell that satisfies a said first-type event.

In one subembodiment, the said first-type event comprises Event AX1, where X1 is a positive integer which is no greater than 100.

In one subembodiment, the said first-type event comprises Event BX2, where X2 is a positive integer which is no greater than 100.

In one subembodiment, the said first-type event comprises Event CX3, where X3 is a positive integer which is no greater than 100.

In one subembodiment, the said first-type event comprises Event DX4, where X4 is a positive integer which is no greater than 100.

In one subembodiment, the said first-type event comprises Event EX5, where X5 is a positive integer which is no greater than 100.

In one subembodiment, the said first-type event comprises Event IX7, where X7 is a positive integer which is no greater than 100.

In one subembodiment, the said first-type event comprises Event NX6, where X6 is a positive integer which is no greater than 100.

In one subembodiment, the said first-type event is used to trigger a handover of a TN cell to another TN cell.

In one subembodiment, the said first-type event is used to trigger a handover of an NTN cell to a TN cell.

In one subembodiment, the said first-type event is used to trigger a handover of a TN cell to an NTN cell.

In one subembodiment, the said first-type event is used to trigger a handover of an NTN cell to another NTN cell.

In one subembodiment, the said first-type event being satisfied is used to trigger transmission of the first message.

In one subembodiment, the said first-type event is related to the first threshold in the present disclosure.

In one subembodiment, the said first-type event is related to the second threshold in the present disclosure.

In one subembodiment, the said first-type event is related to the first threshold and the second threshold in the present disclosure.

In one subembodiment, the said first-type event satisfied by the first cell is the same as the said first-type event satisfied by the second cell.

In one subembodiment, the said first-type event satisfied by the first cell is different from the said first-type event satisfied by the second cell.

In one embodiment, the phrase that at least one of a cell parameter of the first cell or a cell parameter of the second cell is used to determine an order of how the first measurement result and the second measurement result are arranged in the first message comprises: determining the order of how the first measurement result and the second measurement result are arranged in the first message according to at least one of a cell parameter of the first cell or a cell parameter of the second cell.

In one embodiment, the phrase that at least one of a cell parameter of the first cell or a cell parameter of the second cell is used to determine an order of how the first measurement result and the second measurement result are arranged in the first message comprises: the cell parameter being used to determine the order of how the first measurement result and the second measurement result are arranged in the first message.

In one embodiment, the phrase that at least one of a cell parameter of the first cell or a cell parameter of the second cell is used to determine an order of how the first measurement result and the second measurement result are arranged in the first message comprises: determining the order of how the first measurement result and the second measurement result are arranged in the first message according to the cell parameter of the first cell and the cell parameter of the second cell.

In one embodiment, the phrase that at least one of a cell parameter of the first cell or a cell parameter of the second cell is used to determine an order of how the first measurement result and the second measurement result are arranged in the first message comprises: determining the order of how the first measurement result and the second measurement result are arranged in the first message according to the cell parameter of the first cell.

In one embodiment, the phrase that at least one of a cell parameter of the first cell or a cell parameter of the second cell is used to determine an order of how the first measurement result and the second measurement result are arranged in the first message comprises: determining the order of how the first measurement result and the second measurement result are arranged in the first message according to the cell parameter of the second cell.

In one embodiment, the phrase that at least one of a cell parameter of the first cell or a cell parameter of the second cell is used to determine an order of how the first measurement result and the second measurement result are arranged in the first message comprises: the order of how the first measurement result and the second measurement result are arranged in the first message being dependent upon at least one of the cell parameter of the first cell or the cell parameter of the second cell.

In one embodiment, the phrase that at least one of a cell parameter of the first cell or a cell parameter of the second cell is used to determine an order of how the first measurement result and the second measurement result are arranged in the first message comprises: the order of how the first measurement result and the second measurement result are arranged in the first message being dependent upon both the cell parameter of the first cell and the cell parameter of the second cell.

In one embodiment, the phrase that at least one of a cell parameter of the first cell or a cell parameter of the second cell is used to determine an order of how the first measurement result and the second measurement result are arranged in the first message comprises: the order of how the first measurement result and the second measurement result are arranged in the first message being dependent upon the cell parameter of the first cell.

In one embodiment, the phrase that at least one of a cell parameter of the first cell or a cell parameter of the second cell is used to determine an order of how the first measurement result and the second measurement result are arranged in the first message comprises: the order of how the first measurement result and the second measurement result are arranged in the first message being dependent upon the cell parameter of the second cell.

In one embodiment, the phrase that at least one of a cell parameter of the first cell or a cell parameter of the second cell is used to determine an order of how the first measurement result and the second measurement result are arranged in the first message comprises: the cell parameter of the first cell and the cell parameter of the second cell both being used to determine the order of how the first measurement result and the second measurement result are arranged in the first message.

In one embodiment, the phrase that at least one of a cell parameter of the first cell or a cell parameter of the second cell is used to determine an order of how the first measurement result and the second measurement result are arranged in the first message comprises: the cell parameter of the first cell being used to determine the order of how the first measurement result and the second measurement result are arranged in the first message.

In one embodiment, the phrase that at least one of a cell parameter of the first cell or a cell parameter of the second cell is used to determine an order of how the first measurement result and the second measurement result are arranged in the first message comprises: the cell parameter of the second cell being used to determine the order of how the first measurement result and the second measurement result are arranged in the first message.

In one embodiment, the cell parameter of the first cell is the same as the cell parameter of the second cell.

In one embodiment, the cell parameter of the first cell is different from the cell parameter of the second cell.

In one embodiment, the cell parameter is used to indicate that a given cell is an NTN cell.

In one embodiment, the cell parameter is used to indicate that a given cell is a TN cell.

In one embodiment, the cell parameter comprises the type of the cell.

In one embodiment, the cell parameter comprises the height of the cell.

In one embodiment, the cell parameter comprises the orbit of the cell.

In one embodiment, the cell parameter comprises the delay of the cell.

In one embodiment, the cell comprises the first cell.

In one embodiment, the cell comprises the second cell.

In one embodiment, the delay of the cell comprises: a Round Trip Time (RTT).

In one embodiment, the delay of the cell comprises: a Timing Advance (TA).

In one embodiment, the delay of the cell comprises: a Common Delay.

In one embodiment, the delay of the cell comprises: a Specific Delay.

In one embodiment, the delay of the cell comprises: a Common TA between the first node and a maintenance base station for the cell.

In one embodiment, the delay of the cell comprises: a UE-specific delay, the UE-specific delay being determined by a UE.

In one embodiment, the height of the cell comprises: a height of a maintenance base station for the cell.

In one embodiment, the height of the cell comprises: an elevation of a maintenance base station for the cell.

In one embodiment, the height of the cell comprises: a distance between a maintenance base station for the cell and the horizon.

In one embodiment, the height of the cell comprises: a vertical distance between a maintenance base station for the cell and the horizon.

In one embodiment, the type of the cell comprises: the cell is an NTN cell.

In one embodiment, the type of the cell comprises: the cell is a TN cell.

In one embodiment, the orbit of the cell comprises: an orbit of a maintenance base station for the cell.

In one embodiment, the orbit of the cell comprises: a running orbit of a maintenance base station for the cell.

In one embodiment, the orbit of the cell comprises: Non-Geostationary Satellite Orbit (NGSO).

In one embodiment, the orbit of the cell comprises: Geostationary Earth Orbit (GEO).

In one embodiment, the orbit of the cell comprises: Highly Elliptical Orbit (HEO).

In one embodiment, the orbit of the cell comprises: Low Earth Orbit (LEO).

In one embodiment, the orbit of the cell comprises: Medium Earth Orbit (MEO).

In one embodiment, the cell parameter comprises an Ephemeris of the cell.

In one embodiment, the Ephemeris of the cell comprises: periodical statistics used for computing satellite positions.

In one embodiment, the Ephemeris of the cell is used to determine a satellite position at a given time.

In one embodiment, the Ephemeris of the cell comprises time information.

In one embodiment, the Ephemeris of the cell comprises information of satellite orbit.

In one embodiment, the Ephemeris of the cell comprises information of satellite type.

In one embodiment, the Ephemeris of the cell comprises information of satellite altitude.

In one embodiment, the cell parameter is configured by an RRC message.

In one embodiment, the cell parameter is obtained from measurements by a UE.

In one embodiment, the cell parameter is determined by implementation of a UE.

In one embodiment, the cell parameter of a given cell indicates that the given cell is an NTN cell or a TN cell.

In one subembodiment, the cell parameter of the given cell comprises the type of the given cell, which is explicitly indicated by an RRC message.

In one subsidiary embodiment of the above subembodiment, the RRC message comprises a Master Information Block (MIB) message.

In one subsidiary embodiment of the above subembodiment, the RRC message comprises a System Information Block (SIB) message.

In one subsidiary embodiment of the above subembodiment, the RRC message comprises a RRCReconfiguration message.

In one subsidiary embodiment of the above subembodiment, the RRC message comprises a field, the field indicating the type of the given cell.

In one inferior embodiment of the above subsidiary embodiment, the field indicates that the given cell is an NTN cell.

In one inferior embodiment of the above subsidiary embodiment, the field indicates that the given cell is a TN cell.

In one inferior embodiment of the above subsidiary embodiment, the field indicates a type of an NTN cell of the given cell.

In one subembodiment, the cell parameter of the given cell comprises the type of the given cell, which is implicitly indicated by an RRC message.

In one subsidiary embodiment of the above subembodiment, the RRC message comprises a field, the field indicating the orbit of the given cell.

In one subsidiary embodiment of the above subembodiment, the RRC message comprises a field, the field indicating the height of the given cell.

In one subsidiary embodiment of the above subembodiment, the RRC message comprises a field, the field indicating the delay of the given cell.

In one subsidiary embodiment of the above subembodiment, the RRC message comprises a field, the field indicating the ephemeris of the given cell.

In one embodiment, the given cell comprises the first cell.

In one embodiment, the given cell comprises the second cell.

In one embodiment, the given cell comprises the source cell.

In one embodiment, the given cell comprises the serving cell.

In one embodiment, the given cell comprises the neighboring cell.

In one embodiment, the given cell comprises the detected cell.

In one embodiment, the given cell comprises the listed cell.

Embodiment 2

Embodiment 2 illustrates a schematic diagram of a network architecture according to one embodiment of the present disclosure, as shown in FIG. 2. FIG. 2 is a diagram illustrating a network architecture 200 of 5G NR, Long-Term Evolution (L1E) and Long-Term Evolution Advanced (LTE-A) systems. The 5G NR or LTE network architecture 200 may be called a 5G System/Evolved Packet System (5GS/EPS) 200 or other suitable terminology. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 241 corresponds to the first node in the present disclosure.

In one embodiment, the UE 201 is a UE.

In one embodiment, the gNB203 corresponds to the second node in the present disclosure.

In one embodiment, the gNB203 corresponds to the third node in the present disclosure.

In one embodiment, the gNB203 corresponds to the fourth node in the present disclosure.

In one embodiment, the gNB204 corresponds to the second node in the present disclosure.

In one embodiment, the gNB204 corresponds to the third node in the present disclosure.

In one embodiment, the gNB204 corresponds to the fourth node in the present disclosure.

In one embodiment, the gNB203 is an NTN node.

In one embodiment, the gNB203 is a BaseStation (BS).

In one embodiment, the gNB203 is a UE.

In one embodiment, the gNB203 is a relay.

In one embodiment, the gNB203 is a Gateway.

In one embodiment, the gNB204 is an NTN node.

In one embodiment, the UE supports transmissions in Non-Terrestrial Network (NTN).

In one embodiment, the UE supports transmissions in Terrestrial Network (TN).

In one embodiment, the UE supports transmissions in large-delay-difference networks.

In one embodiment, the UE supports Dual Connection (DC) transmissions.

In one embodiment, the UE comprises an aircraft.

In one embodiment, the UE comprises a vehicle-mounted terminal.

In one embodiment, the UE comprises a vessel.

In one embodiment, the UE comprises an Internet-of-Things (IoT) terminal.

In one embodiment, the UE comprises an Industrial IoT (IIoT) terminal.

In one embodiment, the UE is a piece of equipment supporting transmissions with low delay and high reliability.

In one embodiment, the UE comprises test equipment.

In one embodiment, the UE comprises a signaling test instrument.

In one embodiment, the base station supports transmissions in NTN.

In one embodiment, the base station supports transmissions in large-delay-difference networks.

In one embodiment, the base station supports transmissions in TN.

In one embodiment, the base station comprises a Macro-Cellular base station.

In one embodiment, the base station comprises a Micro Cell base station.

In one embodiment, the base station comprises a Pico Cell base station.

In one embodiment, the base station comprises a Femto-cell.

In one embodiment, the base station comprises a base station device supporting large time-delay difference.

In one embodiment, the base station comprises a flight platform.

In one embodiment, the base station comprises satellite equipment.

In one embodiment, the base station comprises a High Altitude Platform Station (HAPS).

In one embodiment, the base station comprises an Unmanned Aircraft System.

In one embodiment, the base station comprises a Transmitter Receiver Point (TRP).

In one embodiment, the base station comprises a Centralized Unit (CU).

In one embodiment, the base station comprises a Distributed Unit (DU).

In one embodiment, the base station comprises test equipment.

In one embodiment, the base station comprises a signaling test instrument.

In one embodiment, the base station comprises an Integrated Access and Backhaul-node (IAB-node).

In one embodiment, the base station comprises an IAB-donor.

In one embodiment, the base station comprises an IAB-donor-CU.

In one embodiment, the base station comprises an IAB-donor-DU.

In one embodiment, the base station comprises an IAB-DU.

In one embodiment, the base station comprises an IAB-MT.

In one embodiment, the relay comprises a relay.

In one embodiment, the relay comprises a L3 relay.

In one embodiment, the relay comprises a L2 relay.

In one embodiment, the relay comprises a Router.

In one embodiment, the relay comprises an Exchanger.

In one embodiment, the relay comprises a UE.

In one embodiment, the relay comprises a base station.

Embodiment 3

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the UE and the gNB via the PHY 301. The L2 305 comprises a Medium Access Control (MAC) sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a packet and provides support for inter-cell handover. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling. The radio protocol architecture in the user plane 350 comprises the L1 layer and the L2 layer. In the user plane 350, the radio protocol architecture used for a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the radio protocol architecture in FIG. 3 is applicable to the fourth node in the present disclosure.

In one embodiment, the first message in the present disclosure is generated by the RRC306.

In one embodiment, the first message in the present disclosure is generate by the MAC302 or the MAC352.

In one embodiment, the first message in the present disclosure is generated by the PHY301 or the PHY351.

In one embodiment, the second message in the present disclosure is generated by the RRC306.

In one embodiment, the second message in the present disclosure is generate by the MAC302 or the MAC352.

In one embodiment, the second message in the present disclosure is generated by the PHY301 or the PHY351.

In one embodiment, the first signaling in the present disclosure is generated by the RRC 306.

In one embodiment, the first signaling in the present disclosure is generate by the MAC302 or the MAC352.

In one embodiment, the first signaling in the present disclosure is generated by the PHY301 or the PHY351.

In one embodiment, the second signaling in the present disclosure is generated by the RRC306.

In one embodiment, the second signaling in the present disclosure is generate by the MAC302 or the MAC352.

In one embodiment, the second signaling in the present disclosure is generated by the PHY301 or the PHY351.

In one embodiment, the third signaling in the present disclosure is generated by the RRC306.

In one embodiment, the third signaling in the present disclosure is generate by the MAC302 or the MAC352.

In one embodiment, the third signaling in the present disclosure is generated by the PHY301 or the PHY351.

In one embodiment, the fourth signaling in the present disclosure is generated by the RRC 306.

In one embodiment, the fourth signaling in the present disclosure is generate by the MAC302 or the MAC352.

In one embodiment, the fourth signaling in the present disclosure is generated by the PHY301 or the PHY351.

In one embodiment, the first reference signal in the present disclosure is generated by the PHY301 or the PHY351.

In one embodiment, the second reference signal in the present disclosure is generated by the PHY301 or the PHY351.

Embodiment 4

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, herein, the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication node 450 comprises at least one processor and at least one memory, the at least one memory comprises computer program codes; the at least one memory and the computer program codes are configured to be used in collaboration with the at least one processor. the first communication device 450 at least: performs a first-type measurement, the first-type measurement being used to determine a first measurement result and a second measurement result; and transmits a first message, the first message comprising the first measurement result and the second measurement result; herein, the first measurement result is associated with a first cell, while the second measurement result is associated with a second cell, the first cell and the second cell are respectively two different cells, and a RAT adopted by the first cell is the same as a RAT adopted by the second cell; the first message comprises a measurement report; at least one of a cell parameter of the first cell or a cell parameter of the second cell is used to determine an order of how the first measurement result and the second measurement result are arranged in the first message; the cell parameter comprises at least one of a cell type, a cell height, or a cell orbit or a cell delay.

In one embodiment, the first communication node 450 comprises a memory that stores computer readable instruction program, the computer readable instruction program generates actions when executed by at least one processor, which include: performing a first-type measurement, the first-type measurement being used to determine a first measurement result and a second measurement result; and transmitting a first message, the first message comprising the first measurement result and the second measurement result; herein, the first measurement result is associated with a first cell, while the second measurement result is associated with a second cell, the first cell and the second cell are respectively two different cells, and a RAT adopted by the first cell is the same as a RAT adopted by the second cell; the first message comprises a measurement report; at least one of a cell parameter of the first cell or a cell parameter of the second cell is used to determine an order of how the first measurement result and the second measurement result are arranged in the first message; the cell parameter comprises at least one of a cell type, a cell height, or a cell orbit or a cell delay.

In one embodiment, the second communication node 410 comprises at least one processor and at least one memory, the at least one memory comprises computer program codes; the at least one memory and the computer program codes are configured to be used in collaboration with the at least one processor. The second communication device 410 at least: receives a first message, the first message comprising a first measurement result and a second measurement result; herein, a first-type measurement is performed, the first-type measurement being used to determine the first measurement result and the second measurement result; the first measurement result is associated with a first cell, while the second measurement result is associated with a second cell, the first cell and the second cell are respectively two different cells, and a RAT adopted by the first cell is the same as a RAT adopted by the second cell; the first message comprises a measurement report; at least one of a cell parameter of the first cell or a cell parameter of the second cell is used to determine an order of how the first measurement result and the second measurement result are arranged in the first message; the cell parameter comprises at least one of a cell type, a cell height, or a cell orbit or a cell delay.

In one embodiment, the second communication node 410 comprises a memory that stores computer readable instruction program, the computer readable instruction program generates actions when executed by at least one processor, which include: receiving a first message, the first message comprising a first measurement result and a second measurement result; herein, a first-type measurement is performed, the first-type measurement being used to determine the first measurement result and the second measurement result; the first measurement result is associated with a first cell, while the second measurement result is associated with a second cell, the first cell and the second cell are respectively two different cells, and a RAT adopted by the first cell is the same as a RAT adopted by the second cell; the first message comprises a measurement report; at least one of a cell parameter of the first cell or a cell parameter of the second cell is used to determine an order of how the first measurement result and the second measurement result are arranged in the first message; the cell parameter comprises at least one of a cell type, a cell height, or a cell orbit or a cell delay.

In one embodiment, the antenna 452, the receiver 454, the receiving processor 456, and the controller/processor 459 are used for receiving a first reference signal; at least one of the antenna 420, the transmitter 418, the transmitting processor 416 or the controller/processor 475 is used for transmitting a first reference signal.

In one embodiment, the antenna 452, the receiver 454, the receiving processor 456, and the controller/processor 459 are used for receiving a second reference signal; at least one of the antenna 420, the transmitter 418, the transmitting processor 416 or the controller/processor 475 is used for transmitting a second reference signal.

In one embodiment, the antenna 452, the receiver 454, the receiving processor 456, and the controller/processor 459 are used for receiving a first signaling; at least one of the antenna 420, the transmitter 418, the transmitting processor 416 or the controller/processor 475 is used for transmitting a first signaling.

In one embodiment, the antenna 452, the receiver 454, the receiving processor 456, and the controller/processor 459 are used for receiving a second signaling; at least one of the antenna 420, the transmitter 418, the transmitting processor 416 or the controller/processor 475 is used for transmitting a second signaling.

In one embodiment, the antenna 452, the receiver 454, the receiving processor 456, and the controller/processor 459 are used for receiving a third signaling; at least one of the antenna 420, the transmitter 418, the transmitting processor 416 or the controller/processor 475 is used for transmitting a third signaling.

In one embodiment, the antenna 452, the receiver 454, the receiving processor 456, and the controller/processor 459 are used for receiving a fourth signaling; at least one of the antenna 420, the transmitter 418, the transmitting processor 416 or the controller/processor 475 is used for transmitting a fourth signaling.

In one embodiment, the antenna 452, the transmitter 454, the transmitting processor 468 and the controller/processor 459 are used for transmitting a first message; at least one of the antenna 420, the receiver 418, the receiving processor 470 or the controller/processor 475 is used for receiving a first message.

In one embodiment, the antenna 452, the transmitter 454, the transmitting processor 468 and the controller/processor 459 are used for transmitting a second message; at least one of the antenna 420, the receiver 418, the receiving processor 470 or the controller/processor 475 is used for receiving a second message.

In one embodiment, the first communication device 450 corresponds to the first node in the present disclosure.

In one embodiment, the second communication device 410 corresponds to the second node in the present disclosure.

In one embodiment, the second communication device 410 corresponds to the third node in the present disclosure.

In one embodiment, the second communication device 410 corresponds to the fourth node in the present disclosure.

In one embodiment, the first communication device 450 is a UE.

In one embodiment, the first communication device 450 is a UE supporting large delay difference.

In one embodiment, the first communication device 450 is a UE supporting NTN.

In one embodiment, the first communication device 450 is an aircraft.

In one embodiment, the first communication device 450 is capable of positioning.

In one embodiment, the first communication device 450 is incapable of positioning.

In one embodiment, the first communication device 450 is a UE supporting TN.

In one embodiment, the second communication device 410 is a base station (gNB/eNB/ng-eNB).

In one embodiment, the second communication device 410 is a base station supporting large delay difference.

In one embodiment, the second communication device 410 is a base station supporting NTN.

In one embodiment, the second communication device 410 is satellite equipment.

In one embodiment, the second communication device 410 is a flight platform.

In one embodiment, the second communication device 410 is a base station supporting TN.

Embodiment 5

Figure 5:
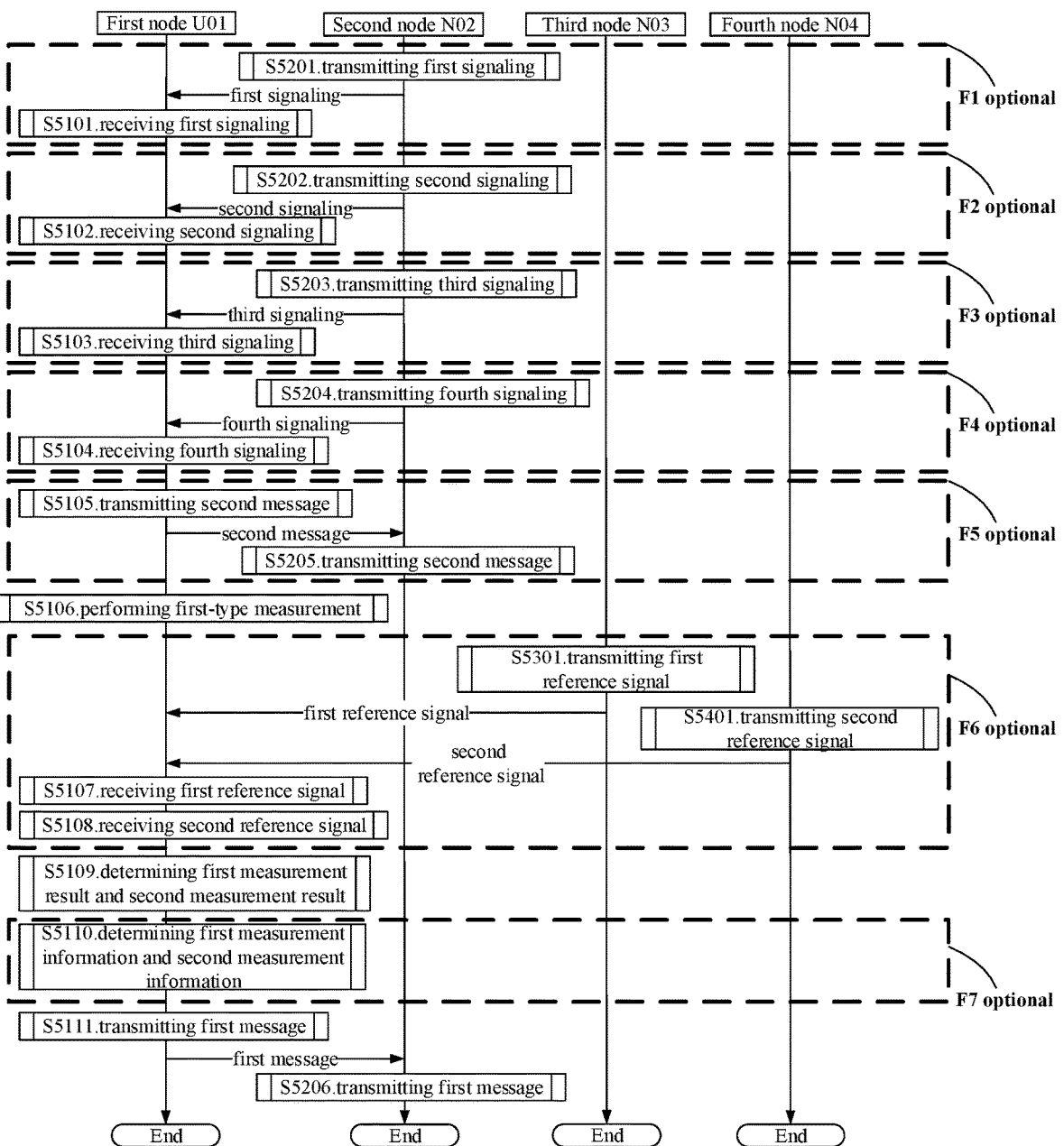
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. It should be particularly noted that the sequence illustrated herein does not set any limit to the signal transmission order or implementation order in the present disclosure.

The first node U01 receives a first signaling in step S5101; receives a second signaling in step S5102; receives a third signaling in step S5103; receives a fourth signaling in step S5104; transmits a second message in step S5105; performs a first-type measurement in step S5106; receives a first reference signal in the first cell in step S5107; receives a second reference signal in the second cell in step S5108; determines a first measurement result and a second measurement result in step S5109; determines first measurement information and second measurement information in step S5110; and transmits a first message in step S5111.

The second node N02 transmits the first signaling in step S5201; transmits the second signaling in step S5202; transmits the third signaling in step S5203; transmits the fourth signaling in step S5204; transmits the second message in step S5205; and transmits the first message in step S5206;

The third node N03 transmits the first reference signal in step S5301.

The fourth node N04 transmits the second reference signal in step S5401.

In Embodiment 5, the first signaling indicates the first measurement quantity set, the first-type measurement being associated with the first measurement quantity set; the first measurement quantity set is related to signal quality; the second signaling indicates the second measurement quantity set, the first-type measurement being associated with the second measurement quantity set; the first measurement information is associated with the first cell, while the second measurement information is associated with the second cell; the second measurement quantity set is unrelated to signal quality; the third signaling comprises a first threshold, the first threshold being related to the first measurement quantity set; the fourth signaling comprises a second threshold, the second threshold being related to the second measurement quantity set; the second message is used to indicate the cell priority, and the second message comprises an RRC message; the cell priority is related to the cell parameter; the first-type measurement is used to determine a first measurement result and a second measurement result; and the first message comprises the first measurement result and the second measurement result; the first measurement result is associated with a first cell, while the second measurement result is associated with a second cell, the first cell and the second cell are respectively two different cells, and a RAT adopted by the first cell is the same as a RAT adopted by the second cell; the first message comprises a measurement report; the cell parameter comprises at least one of a cell type, a cell height, or a cell orbit or a cell delay; the first measurement result and the second measurement result fulfill the first threshold, or the first measurement information and the second measurement information fulfill the second threshold; at least one of a cell parameter of the first cell or a cell parameter of the second cell is used to determine an order of how the first measurement result and the second measurement result are arranged in the first message, or the first measurement quantity set is used to determine an order of how the first measurement result and the second measurement result are arranged in the first message, or the second measurement quantity set is used to determine an order of how the first measurement result and the second measurement result are arranged in the first message, or a cell priority is used to determine an order of how the first measurement result and the second measurement result are arranged in the first message, or, the cell parameter of a first serving cell is used to determine an order of how the first measurement result and the second measurement result are arranged in the first message.

In one embodiment, in the step S5109, a measurement for the first reference signal according to a first measurement quantity set is used to determine the first measurement result, while a measurement for the second reference signal according to the first measurement quantity set is used to determine the second measurement result.

In one embodiment, in the step S5110, first measurement information is determined according to a second measurement quantity set, and second measurement information is determined according to the second measurement quantity set.

In one embodiment, the first signaling is transmitted via an air interface.

In one embodiment, the first signaling is transmitted via an antenna port.

In one embodiment, the first signaling comprises a Downlink (DL) signal.

In one embodiment, the first signaling comprises a Sidelink (SL) signal.

In one embodiment, the first signaling comprises an RRC message.

In one embodiment, the first signaling comprises at least one of a RRCReconfiguration message, or a RRCResume message, or a SCGFailureInformation message or a SCGFailureInformationEUTRA message, or MCGFailureInformation, or a SIB12.

In one embodiment, the first signaling comprises one or more IEs in an RRC message, and names of the one or more IEs include at least one of MeasConfig, or ReportConfigNR, or ReportConfigInterRAT, or ReportConfigNR-SL, or ReportConfigToAddModList or sl-MeasConfigCommon.

In one embodiment, the first signaling comprises one IE in an RRC message, and names of the IE include MeasConfig.

In one embodiment, the first signaling comprises one IE in an RRC message, and names of the IE include MeasGapConfig.

In one embodiment, the first signaling comprises one IE in an RRC message, and names of the IE include QuantityConfig.

In one embodiment, the first signaling comprises one IE in an RRC message, and names of the IE include FilterCoefficient.

In one embodiment, the first signaling comprises one or more fields in an RRC message, and names of the one or more fields include at least one of QuantityConfigNR, or QuantityConfigRS, or quantityConfigCell, or quantityConfigRS-Index, or ssb-FilterConfig, or csi-RS-FilterConfig, or FilterConfig, or filterCoefficientRSRP, or filterCoefficientRSRQ or filterCoefficientRS-SINR.

In one embodiment, the first signaling comprises one or more fields in an RRC message, and names of the one or more fields include at least one of reportType, or PeriodicalReportConfig, or EventTriggerConfig, or CondTriggerConfig, or condEventId, or a3-Offset, or a5-Threshold1, or a1-Threshold, or a2-Threshold, or a4-Threshold, or a5-Threshold1, or a6-Offset, or MeasTriggerQuantityOffset, or MeasTriggerQuantity, or MeasReportQuantity, or MeasRSSI-ReportConfig, or CLI-EventTriggerConfig, or MeasTriggerQuantityCLI, or MeasReportQuantityCLI, or rsrp, or rsrq, or sinr, or srs-RSRP or cli-RSSI.

In one embodiment, the phrase that the first signaling indicates the first measurement quantity set comprises: the first measurement quantity set comprises one IE in the first signaling.

In one embodiment, the phrase that the first signaling indicates the first measurement quantity set comprises: the first measurement quantity set comprises one field in the first signaling.

In one embodiment, the phrase that the first signaling indicates the first measurement quantity set comprises: the first signaling comprises the first measurement quantity set.

In one embodiment, a measurement quantity comprised in the first measurement quantity set comprises a Measurement Quantity.

In one embodiment, a measurement quantity comprised in the first measurement quantity set comprises a Reporting Quantity.

In one embodiment, a measurement quantity comprised in the first measurement quantity set comprises a Trigger quantity.

In one embodiment, the first measurement quantity set is comprised of K1 measurement quantity(quantities), K1 being a positive integer no greater than 8.

In one subembodiment, one of the K1 measurement quantity(quantities) comprises an RSRP.

In one subembodiment, one of the K1 measurement quantity(quantities) comprises an RSRQ.

In one subembodiment, one of the K1 measurement quantity(quantities) comprises a SINR.

In one subembodiment, one of the K1 measurement quantity(quantities) comprises an srs-RSRP.

In one subembodiment, one of the K1 measurement quantity(quantities) comprises a cli-RSSI.

In one subembodiment, one of the K1 measurement quantity(quantities) comprises a Received Signal Code Power (RSCP).

In one subembodiment, one of the K1 measurement quantity(quantities) comprises a EcN0.

In one subembodiment, when K1 is equal to 1, the first measurement quantity set only comprises one measurement quantity, and the only one measurement quantity is used to determine the order of how the first measurement result and the second measurement result are arranged in the first message.

In one subsidiary embodiment of the above subembodiment, the measurement quantity comprises each quantity used in an aN-Threshold respectively for eventA1, eventA2 and eventA4.

In one subsidiary embodiment of the above subembodiment, the measurement quantity comprises a quantity used in a a5-Threshold2 for eventA5.

In one subsidiary embodiment of the above subembodiment, the measurement quantity comprises each quantity used in an aN-Offset respectively for eventA3 and eventA6.

In one subembodiment, when K1 is greater than 1, a measurement quantity comprised in the first measurement quantity set is used to determine the order of how the first measurement result and the second measurement result are arranged in the first message.

In one subsidiary embodiment of the above subembodiment, when an RSRP is set to true or 1, the measurement quantity comprises the RSRP; otherwise, the measurement quantity comprises an RSRQ.

In one subsidiary embodiment of the above subembodiment, when an RSRQ is set to true or 1, the measurement quantity comprises the RSRQ; otherwise, the measurement quantity comprises an RSRP.

In one embodiment, the phrase that the first-type measurement is associated with the first measurement quantity set comprises: the first-type measurement adopts the first measurement quantity set.

In one embodiment, the phrase that the first-type measurement is associated with the first measurement quantity set comprises: the first-type measurement adopts one or more of measurement quantities comprised in the first measurement quantity set.

In one embodiment, the phrase that the first measurement quantity set is related to signal quality comprises: a measurement quantity in the first measurement quantity set is used to determine signal quality.

In one embodiment, the phrase that the first measurement quantity set is related to signal quality comprises: a measurement quantity in the first measurement quantity set is used to determine a reference signal received power.

In one embodiment, the phrase that the first measurement quantity set is related to signal quality comprises: a measurement quantity in the first measurement quantity set reflects a signal received quality of a cell.

In one embodiment, the phrase of receiving a first reference signal in the first cell comprises: the first reference signal is a reference signal in the first cell.

In one embodiment, the phrase of receiving a first reference signal in the first cell comprises: the first reference signal is transmitted in the first cell.

In one embodiment, the phrase of receiving a first reference signal in the first cell comprises: the first reference signal carries information of the first cell.

In one embodiment, the phrase of receiving a first reference signal in the first cell comprises: the first reference signal is a reference signal specific to the first cell.

In one embodiment, the phrase of receiving a second reference signal in the second cell comprises: the second reference signal is a reference signal in the second cell.

In one embodiment, the phrase of receiving a second reference signal in the second cell comprises: the second reference signal is transmitted in the second cell.

In one embodiment, the phrase of receiving a second reference signal in the second cell comprises: the second reference signal carries information of the second cell.

In one embodiment, the phrase of receiving a second reference signal in the second cell comprises: the second reference signal is a reference signal specific to the second cell.

In one embodiment, the first reference signal and the second reference signal respectively comprise a physical-layer signal.

In one embodiment, the first reference signal and the second reference signal respectively comprise a periodical signal.

In one embodiment, the first reference signal and the second reference signal respectively comprise a Reference Signal.

In one embodiment, the first reference signal is indicated by a field in an RRC message, and the field's name includes rsType.

In one embodiment, the first reference signal comprises at least one of an ssb, or an SS/PBCH block or a csi-rs.

In one embodiment, the second reference signal is indicated by a field in an RRC message, and the field's name includes rsType.

In one embodiment, the second reference signal comprises at least one of an ssb, or an SS/PBCH block or a csi-rs.

In one embodiment, the phrase that a measurement for the first reference signal according to a first measurement quantity set is used to determine the first measurement result comprises: the first measurement result comprises a measurement result obtained by L3 filtering based on the first reference signal according to the first measurement quantity set.

In one embodiment, the phrase that a measurement for the first reference signal according to a first measurement quantity set is used to determine the first measurement result comprises: the first measurement result comprises a measurement result obtained by a measurement on the first reference signal that is related to a measurement quantity comprised in the first measurement quantity set.

In one embodiment, the phrase that a measurement for the second reference signal according to the first measurement quantity set is used to determine the second measurement result comprises: the second measurement result comprises a measurement result obtained by L3 filtering based on the second reference signal according to the first measurement quantity set.

In one embodiment, the phrase that a measurement for the second reference signal according to the first measurement quantity set is used to determine the second measurement result comprises: the second measurement result comprises a measurement result obtained by a measurement on the second reference signal that is related to a measurement quantity comprised in the first measurement quantity set.

In one embodiment, the phrase that the first measurement quantity set is used to determine the order of how the first measurement result and the second measurement result are arranged in the first message comprises: the first measurement result and the second measurement result are sorted in a descending order in the first message according to one measurement quantity in the first measurement quantity set.

In one embodiment, the phrase that the first measurement quantity set is used to determine the order of how the first measurement result and the second measurement result are arranged in the first message comprises: a measurement quantity in the first measurement quantity set is a sorting quantity of measurement results.

In one embodiment, the second signaling is transmitted via an air interface.

In one embodiment, the second signaling is transmitted via an antenna port.

In one embodiment, the second signaling comprises a Downlink (DL) signal.

In one embodiment, the second signaling comprises a Sidelink (SL) signal.

In one embodiment, the second signaling comprises an RRC message.

In one embodiment, the second signaling comprises at least one of a RRCReconfiguration message, or a RRCResume message, or a SCGFailureInformation message or a SCGFailureInformationEUTRA message, or MCGFailureInformation, or a SIB12.

In one embodiment, the second signaling comprises one or more IEs in an RRC message, and names of the one or more IEs include at least one of MeasConfig, or ReportConfigNR, or ReportConfigInterRAT, or ReportConfigNR-SL, or ReportConfigToAddModList or sl-MeasConfigCommon.

In one embodiment, the second signaling comprises one IE in an RRC message, and names of the IE include MeasConfig.

In one embodiment, the second signaling comprises one IE in an RRC message, and names of the IE include MeasGapConfig.

In one embodiment, the second signaling comprises one field in an RRC message, and names of the field include MeasTriggerQuantity, or MeasTriggerQuantityOffset, or MeasReportQuantity, or MeasReportQuantity-NTN.

In one embodiment, the second signaling comprises one field in an RRC message, and names of the field include at least one of Meas, or Trigger, or Report, or Quantity, or Offset or NTN.

In one embodiment, the phrase that the second signaling indicates the second measurement quantity set comprises: the second measurement quantity set comprises one IE in the second signaling.

In one embodiment, the phrase that the second signaling indicates the second measurement quantity set comprises: the second measurement quantity set comprises one field in the second signaling.

In one embodiment, the phrase that the second signaling indicates the second measurement quantity set comprises: the second signaling comprises the second measurement quantity set.

In one embodiment, the phrase that the first-type measurement is associated with the second measurement quantity set comprises: the first-type measurement adopts the second measurement quantity set.

In one embodiment, the phrase that the first-type measurement is associated with the first measurement quantity set comprises: the first-type measurement adopts one or more of measurement quantities comprised in the second measurement quantity set.

In one embodiment, the first-type measurement adopts the first measurement quantity set and the second measurement quantity set.

In one embodiment, the first-type measurement adopts one or more of measurement quantities comprised in the first measurement quantity set, and the first-type measurement adopts one or more of measurement quantities comprised in the second measurement quantity set.

In one embodiment, the phrase that the second measurement quantity set is unrelated to signal quality comprises: the second measurement quantity set does not reflect a signal strength of the first node U01 in a cell.

In one embodiment, the phrase that the second measurement quantity set is unrelated to signal quality comprises: the second measurement quantity set is unrelated to a received power of the first node U01 in a cell.

In one embodiment, the phrase that the first measurement information is associated with the first cell comprises: the first measurement information is a measurement result obtained by performing the first-type measurement on the first cell.

In one embodiment, the phrase that the first measurement information is associated with the first cell comprises: the first measurement information is a measurement result of the first cell.

In one embodiment, the phrase that the second measurement information is associated with the second cell comprises: the second measurement information is a measurement result obtained by performing the first-type measurement on the second cell.

In one embodiment, the phrase that the second measurement information is associated with the second cell comprises: the second measurement information is a measurement result of the second cell.

In one embodiment, the phrase that the second measurement quantity set is used to determine an order of how the first measurement result and the second measurement result are arranged in the first message comprises: the first measurement result and the second measurement result are sorted in a descending order in the first message according to one measurement quantity in the second measurement quantity set.

In one embodiment, the phrase that the second measurement quantity set is used to determine an order of how the first measurement result and the second measurement result are arranged in the first message comprises: the first measurement result and the second measurement result are sorted in an ascending order in the first message according to one measurement quantity in the second measurement quantity set.

In one embodiment, the phrase that the second measurement quantity set is used to determine an order of how the first measurement result and the second measurement result are arranged in the first message comprises: determining the cell priority according to one measurement quantity in the second measurement quantity set, where the first measurement result and the second measurement result are sorted in a descending order in the first message according to the cell priority.

In one embodiment, the phrase that the first measurement quantity set is used to determine an order of how the first measurement result and the second measurement result are arranged in the first message comprises: a measurement quantity in the first measurement quantity set is a sorting quantity of measurement results.

In one embodiment, the second measurement quantity set is comprised of K2 measurement quantity(quantities), K2 being a positive integer no greater than 100.

In one subembodiment, one of the K2 measurement quantity(quantities) comprises a first angle.

In one subembodiment, one of the K2 measurement quantity(quantities) comprises a cell type.

In one subembodiment, one of the K2 measurement quantity(quantities) comprises a cell height.

In one subembodiment, one of the K2 measurement quantity(quantities) comprises a cell orbit.

In one subembodiment, one of the K2 measurement quantity(quantities) comprises a cell ephemeris.

In one subembodiment, one of the K2 measurement quantity(quantities) comprises a cell delay.

In one subembodiment, one of the K2 measurement quantity(quantities) comprises time.

In one subembodiment, one of the K2 measurement quantity(quantities) comprises position.

In one embodiment, a measurement for the first reference signal according to a first measurement quantity set is used to determine the first measurement result, while a measurement for the second reference signal according to the first measurement quantity set is used to determine the second measurement result; determining first measurement information according to a second measurement quantity set, and determining second measurement information according to the second measurement quantity set; the first message comprises the first measurement result and the second measurement result; and the first message comprises the first measurement information and the second measurement information; the first measurement quantity set is used to determine the order of how the first measurement result and the second measurement result are arranged in the first message.

In one embodiment, a measurement for the first reference signal according to a first measurement quantity set is used to determine the first measurement result, while a measurement for the second reference signal according to the first measurement quantity set is used to determine the second measurement result; determining first measurement information according to a second measurement quantity set, and determining second measurement information according to the second measurement quantity set; the first message comprises the first measurement result and the second measurement result; and the first message comprises the first measurement information and the second measurement information; the second measurement quantity set is used to determine the order of how the first measurement result and the second measurement result are arranged in the first message.

In one embodiment, a measurement for the first reference signal according to a first measurement quantity set is used to determine the first measurement result, while a measurement for the second reference signal according to the first measurement quantity set is used to determine the second measurement result; determining first measurement information according to a second measurement quantity set, and determining second measurement information according to the second measurement quantity set; the first message comprises the first measurement result and the second measurement result; and the first message does not comprise the first measurement information or the second measurement information; the first measurement quantity set is used to determine the order of how the first measurement result and the second measurement result are arranged in the first message.

In one embodiment, a measurement for the first reference signal according to a first measurement quantity set is used to determine the first measurement result, while a measurement for the second reference signal according to the first measurement quantity set is used to determine the second measurement result; determining first measurement information according to a second measurement quantity set, and determining second measurement information according to the second measurement quantity set; the first message comprises the first measurement result and the second measurement result; and the first message does not comprise the first measurement information or the second measurement information; the second measurement quantity set is used to determine the order of how the first measurement result and the second measurement result are arranged in the first message.

In one embodiment, the first measurement information comprises a cell priority of the first cell.

In one embodiment, the first measurement information comprises the first angle of the first cell.

In one embodiment, the first measurement information comprises the cell type of the first cell.

In one embodiment, the first measurement information comprises the cell height of the first cell.

In one embodiment, the first measurement information comprises the cell orbit of the first cell.

In one embodiment, the first measurement information comprises the cell ephemeris of the first cell.

In one embodiment, the first measurement information comprises the cell delay of the first cell.

In one embodiment, the first measurement information comprises a position of the first node U01.

In one embodiment, the second measurement information comprises a cell priority of the second cell.

In one embodiment, the second measurement information comprises the first angle of the second cell.

In one embodiment, the second measurement information comprises the cell type of the second cell.

In one embodiment, the second measurement information comprises the cell height of the second cell.

In one embodiment, the second measurement information comprises the cell orbit of the second cell.

In one embodiment, the second measurement information comprises the cell ephemeris of the second cell.

In one embodiment, the second measurement information comprises the cell delay of the second cell.

In one embodiment, the second measurement information comprises a position of the first node U01.

In one subembodiment, the position of the first node U01 is determined through GNSS or GPS.

In one subembodiment, the position of the first node U01 is determined through PTS.

In one subembodiment, the position of the first node U01 is determined through signal measurements.

In one embodiment, the third signaling is transmitted via an air interface.

In one embodiment, the third signaling is transmitted via an antenna port.

In one embodiment, the third signaling comprises a Downlink (DL) signal.

In one embodiment, the third signaling comprises a Sidelink (SL) signal.

In one embodiment, the third signaling comprises an RRC message.

In one embodiment, the third signaling comprises at least one of a RRCReconfiguration message, or a RRCResume message, or a SCGFailureInformation message or a SCGFailureInformationEUTRA message, or MCGFailure-Information, or a SIB12.

In one embodiment, the third signaling comprises one IE in an RRC message, and names of the IE include at least one of ReportConfigNR, or ReportConfigToAddModList or MeasConfig.

In one embodiment, the third signaling comprising a first threshold comprises: the third signaling is used to determine the first threshold.

In one embodiment, the third signaling comprising a first threshold comprises: the first threshold is a field in the third signaling, and names of the field include at least one of a1-Threshold, or a2-Threshold, or a3-Offset, or a4-Threshold, or a5-Threshold1 or a6-Offset.

In one embodiment, a quantity used by the first threshold is the same as a measurement quantity in the first measurement quantity set.

In one embodiment, the first threshold is used to determine a condition for entry into the first-type event.

In one embodiment, the first threshold is used to determine a condition for adding a given cell to a cellsTriggeredList.

In one embodiment, the phrase of fulfilling the first threshold comprises: being greater than the first threshold.

In one embodiment, the phrase of fulfilling the first threshold comprises: being no less than the first threshold.

In one embodiment, the phrase that the first measurement result and the second measurement result fulfill the first threshold comprises: the first measurement result fulfills the first threshold, and the second measurement result fulfills the first threshold.

In one embodiment, the phrase that the first measurement result and the second measurement result fulfill the first threshold comprises: a relation between the first measurement result and the first threshold fulfills the condition for entry into the first-type event, and a relation between the second measurement result and the first threshold fulfills the condition for entry into the first-type event.

In one embodiment, the fourth signaling is transmitted via an air interface.

In one embodiment, the fourth signaling is transmitted via an antenna port.

In one embodiment, the fourth signaling comprises a Downlink (DL) signal.

In one embodiment, the fourth signaling comprises a Sidelink (SL) signal.

In one embodiment, the fourth signaling comprises an RRC message.

In one embodiment, the fourth signaling comprises at least one of a RRCReconfiguration message, or a RRCResume message, or a SCGFailureInformation message or a SCGFailureInformationEUTRA message, or MCGFailure-Information, or a SIB12.

In one embodiment, the fourth signaling comprises one IE in an RRC message, and names of the IE include at least one of ReportConfigNR, or ReportConfigToAddModList or MeasConfig.

In one embodiment, the fourth signaling comprises one field in an RRC message, and names of the field include at least one of time or Threshold.

In one embodiment, the phrase that the first measurement information and the second measurement information fulfill the second threshold comprises: the first measurement information fulfills the second threshold, and the second measurement information fulfills the second threshold.

In one embodiment, the phrase that the first measurement information and the second measurement information fulfill the second threshold comprises: a relation between the first measurement information and the second threshold fulfills the condition for entry into the first-type event, and a relation between the second measurement information and the second threshold fulfills the condition for entry into the first-type event.

In one embodiment, the second threshold is used to determine a condition for entry.

In one embodiment, the second threshold is used to determine a condition for adding a given cell to a cellsTriggeredList.

In one embodiment, the phrase of fulfilling the second threshold comprises: being greater than the second threshold.

In one embodiment, the phrase of fulfilling the second threshold comprises: being no less than the second threshold.

In one embodiment, the phrase of fulfilling the second threshold comprises: being less than the second threshold.

In one embodiment, the phrase of fulfilling the second threshold comprises: being no greater than the second threshold.

In one embodiment, the second threshold is used to determine that the first node U01 and the serving cell fulfill the condition for entry.

In one embodiment, the second threshold is determined by the first node U01 according to at least one of a position of the first node U01, or the cell ephemeris, or time.

In one embodiment, the second threshold is time-related.

In one embodiment, the second threshold comprises a first instant of time.

In one subembodiment, when the first instant of time is not yet reached, the second threshold is unfulfilled.

In one subembodiment, upon reaching the first instant of time, the second threshold is fulfilled.

In one embodiment, the second threshold is position-related.

In one embodiment, the second threshold is used to determine a first zone.

In one subembodiment, the first zone comprises a boundary position of the first serving cell.

In one subembodiment, when a position of the first node belongs to a first zone, the given measurement information fulfills the second threshold.

In one subembodiment, when a position of the first node does not belong to a first zone, the given measurement information does not fulfill the second threshold.

In one subembodiment, when a distance between a position of the first node and a given position is no smaller than a second threshold and no greater than a third threshold, the position of the first node belongs to the first zone.

In one subembodiment, a unit of measurement of the second threshold includes meter (m).

In one subembodiment, a unit of measurement of the third threshold includes meter (m).

In one subembodiment, the given position comprises an intersection point of a vertical line along gravitational direction of the NTN node and an elevation at which the first node is located.

In one subembodiment, the given position is related to both a height of the NTN node and an elevation of the first node.

In one subembodiment, the given measurement information comprises the first measurement information and the second measurement information.

In one embodiment, the phrase that given measurement information fulfills the second threshold comprises: a distance between a position of the first node and a given position is no smaller than the second threshold.

In one embodiment, the phrase that given measurement information fulfills the second threshold comprises: a distance between a position of the first node and a given position is no greater than the second threshold.

In one embodiment, the fourth signaling comprises a third threshold, the third threshold comprising a second instant of time.

In one subembodiment, upon reaching the second instant of time, the third threshold is fulfilled.

In one subembodiment, the third threshold is used to determine a condition for departure.

In one subembodiment, when the third threshold is fulfilled, the first-type event is unfulfilled.

In one embodiment, the second threshold is used to determine a condition for entry into the first-type event.

In one embodiment, the third threshold is used to determine a condition for departure from the first-type event.

In one embodiment, the first threshold and the second threshold are used to determine a condition for entry into the first-type event.

In one embodiment, the first threshold and the third threshold are used to determine a condition for departure from the first-type event.

In one embodiment, the second threshold is ephemeris-related.

In one embodiment, the phrase that the cell parameter of a first serving cell is used to determine an order of how the first measurement result and the second measurement result are arranged in the first message comprises: the order of how the first measurement result and the second measurement result are arranged in the first message being dependent upon the cell parameter of the first serving cell.

In one embodiment, the phrase that the cell parameter of a first serving cell is used to determine an order of how the first measurement result and the second measurement result are arranged in the first message comprises: the order of how the first measurement result and the second measurement result are arranged in the first message being dependent upon the cell parameter of a source cell.

In one embodiment, the first serving cell includes a serving cell of the first node U01.

In one embodiment, when the first serving cell includes an NTN cell, while the first cell and the second cell include a TN cell, the first measurement result and the second measurement result are sorted in a descending order in the first message according to an RSRP; when the first serving cell includes a TN cell, while the first cell and the second cell include an NTN cell, the first measurement result and the second measurement result are sorted in a descending order in the first message according to an RSRQ.

In one embodiment, when the first serving cell includes an NTN cell, while the first cell and the second cell include a TN cell, the first measurement result and the second measurement result are sorted in a descending order in the first message according to an RSRQ; when the first serving cell includes a TN cell, while the first cell and the second cell include an NTN cell, the first measurement result and the second measurement result are sorted in a descending order in the first message according to an RSRP.

In one embodiment, when the first serving cell includes a TN cell, while the first cell and the second cell include a TN cell, and when there is only one measurement quantity in the first measurement quantity set, the first measurement result and the second measurement result are sorted in a descending order in the first message according to the measurement quantity.

In one embodiment, when the first serving cell includes a TN cell, while the first cell and the second cell include a TN cell, and when the first measurement quantity set comprises multiple measurement quantities, if an rsrp in reportQuantity is set to true, the first measurement result and the second measurement result are sorted in a descending order in the first message according to an RSRP; otherwise, the first measurement result and the second measurement result are sorted in a descending order in the first message according to an RSRQ.

In one embodiment, the phrase that a cell priority is used to determine an order of how the first measurement result and the second measurement result are arranged in the first message comprises: an order of how the first measurement result and the second measurement result are arranged in the first message being dependent upon the cell priority.

In one embodiment, the phrase that a cell priority is used to determine an order of how the first measurement result and the second measurement result are arranged in the first message comprises: determining an order of how the first measurement result and the second measurement result are arranged in the first message according to the cell priority.

In one embodiment, the phrase that a cell priority is used to determine an order of how the first measurement result and the second measurement result are arranged in the first message comprises: the first measurement result and the second measurement result are sorted according to a descending order of the cell priority of the first cell and the cell priority of the second cell in the first message.

In one embodiment, the phrase that a cell priority is used to determine an order of how the first measurement result and the second measurement result are arranged in the first message comprises: the first measurement result and the second measurement result are sorted according to an ascending order of the cell priority of the first cell and the cell priority of the second cell in the first message.

In one embodiment, the cell priority is related to the cell parameter of the first serving cell.

In one subembodiment, when the cell parameter of the first serving cell indicates that the first serving cell is an NTN cell, the cell priority of the NTN cell is higher than that of the TN cell.

In one subembodiment, when the cell parameter of the first serving cell indicates that the first serving cell is a TN cell, the cell priority of the TN cell is higher than that of the NTN cell.

In one embodiment, the cell priority is related to the cell parameter of the first cell and the cell parameter of the second cell.

In one embodiment, the cell priority is related to the cell parameter of the source cell, the cell parameter of the first cell and the cell parameter of the second cell.

In one embodiment, the cell priority is determined via an RRC message.

In one embodiment, the cell priority is decided by implementation of a UE.

In one embodiment, the cell priority is related to a traffic type.

In one subembodiment, the cell priority of a TN cell is higher than that of an NTN cell for URLLC services.

In one subembodiment, the cell priority of an NTN cell is higher than that of a TN cell for intelligent instrument services; the intelligent instrument services include ammeter, water meter and other IoT services.

In one embodiment, the phrase that the cell priority is related to the cell parameter comprises: the cell parameter being used to determine the cell priority.

In one embodiment, the phrase that the cell priority is related to the cell parameter comprises: determining the cell priority according to the cell parameter.

In one embodiment, the phrase that the cell priority is related to the cell parameter comprises: different said cell parameters correspond to different said cell priorities.

In one embodiment, the cell priority of the first cell and the cell priority of the second cell being used to determine the order of how the first measurement result and the second measurement result are arranged in the first message.

In one embodiment, the first measurement result and the second measurement result are sorted in a descending order in the first message according to the cell priority of the first cell and the cell priority of the second cell.

In one subembodiment, when the cell priority of the first cell is higher than that of the second cell, the order of the first measurement result in the first message is prior to that of the second measurement result.

In one subembodiment, when the cell priority of the first cell is lower than that of the second cell, the order of the second measurement result in the first message is prior to that of the first measurement result.

In one subembodiment, when the cell priority of the first cell is equal to that of the second cell, the first measurement result and the second measurement result are sorted in a descending order in the first message according to a given measurement quantity.

In one subsidiary embodiment of the above subembodiment, the given measurement quantity includes a measurement quantity in the first measurement quantity set.

In one subsidiary embodiment of the above subembodiment, the given measurement quantity includes a measurement quantity in the second measurement quantity set.

In one embodiment, the second message is transmitted via an air interface.

In one embodiment, the second message is transmitted via an antenna port.

In one embodiment, the second message is an Uplink (UL) signal.

In one embodiment, the second message is a Sidelink (SL) signal.

In one embodiment, the second message comprises an RRC message.

In one embodiment, the second message comprises a MeasurementReport message.

In one embodiment, the second message comprises a UEAssistanceInformation message.

In one embodiment, the second message comprises a UECapabilityInformation message.

In one embodiment, the second message comprises one IE in an RRC message, and names of the IE include at least one of NTN or Parameters.

In one embodiment, the second message comprises one IE in an RRC message, and names of the IE include NTN-Parameters.

In one embodiment, the second message comprises one field in an RRC message, and names of the field include NTN-at least one of NTN, or TN, Network, Type, or Preference.

In one embodiment, the second message comprises one field in an RRC message, and names of the IE include NTN-Preference.

In one embodiment, the second message comprises one field in an RRC message, and names of the IE include TN-Preference.

In one embodiment, the phrase that the second message is used to indicate the cell priority comprises:

the second message indicates information by the first node U01.

In one embodiment, the phrase that the second message is used to indicate the cell priority comprises: the second message indicates a cell type preferred by the first node U01.

In one embodiment, the phrase that the second message is used to indicate the cell priority comprises: the second message explicitly indicates the cell priority of the first node U01.

In one subembodiment, the second message comprises a field in an RRC message, the field being used to indicate the cell priority.

In one subsidiary embodiment, the field comprises a first sorting, the first sorting being used to indicate the cell priority.

In one inferior embodiment of the above subsidiary embodiment, the first sorting is according to a descending order of the cell priorities.

In one inferior embodiment of the above subsidiary embodiment, the first sorting is comprised of {first type cell, second type cell . . . , N-th type cell}; a cell among the first type cell, the second type cell . . . , and the N-th type cell is either an NTN cell or a TN cell.

In one subsidiary embodiment of the above subembodiment, the field comprises P1 bits, where P1 is an integer greater than 1 and no greater than 8; different values of the P1 bits are used to indicate different cell types; and a value of the field is used to indicate a cell type which is of the highest cell priority.

In one subsidiary embodiment of the above subembodiment, the field comprises 1 bit.

In one subsidiary embodiment of the above subembodiment, the value of the field is a Boolean Value.

In one subsidiary embodiment of the above subembodiment, the value of the field is set to true or 1 to represent NTN, or is set to false or 0 to represent TN.

In one inferior embodiment of the above subsidiary embodiment, when the value of the field is set to true or 1, an NTN cell is of higher priority than a TN cell.

In one inferior embodiment of the above subsidiary embodiment, when the value of the field is set to false or 0, a TN cell is of higher priority than an NTN cell.

In one subsidiary embodiment of the above subembodiment, the value of the field is set to true or 1 to represent TN, or is set to false or 0 to represent NTN.

In one inferior embodiment of the above subsidiary embodiment, when the value of the field is set to true or 1, a TN cell is of higher priority than an NTN cell.

In one inferior embodiment of the above subsidiary embodiment, when the value of the field is set to false or 0, an NTN cell is of higher priority than a TN cell.

In one embodiment, the phrase that the second message is used to indicate the cell priority comprises: the second message implicitly indicates the cell priority of the first node U01.

In one embodiment, the dotted-line box F1 is optional.

In one subembodiment, the dotted-line box F1 exists.

In one subembodiment, the dotted-line box F1 does not exist.

In one embodiment, the dotted-line box F2 is optional.

In one subembodiment, the dotted-line box F2 exists.

In one subembodiment, the dotted-line box F2 does not exist.

In one embodiment, the dotted-line box F3 is optional.

In one subembodiment, the dotted-line box F3 exists.

In one subembodiment, the dotted-line box F3 does not exist.

In one embodiment, the dotted-line box F4 is optional.

In one subembodiment, the dotted-line box F4 exists.

In one subembodiment, the dotted-line box F4 does not exist.

In one embodiment, the dotted-line box F5 is optional.

In one subembodiment, the dotted-line box F5 exists.

In one subembodiment, the dotted-line box F5 does not exist.

In one embodiment, the dotted-line box F6 is optional.

In one subembodiment, the dotted-line box F6 exists.

In one subembodiment, the dotted-line box F6 does not exist.

In one embodiment, the dotted-line box F7 is optional.

In one subembodiment, the dotted-line box F7 exists.

In one subembodiment, the dotted-line box F7 does not exist.

In one embodiment, the dotted-line box F2 exists, and the dotted-line box F4 exists.

In one embodiment, the dotted-line box F2 exists, and the dotted-line box F4 does not exist.

In one embodiment, the dotted-line box F2 does not exist, and the dotted-line box F4 does not exist.

In one embodiment, the dotted-line box F1 exists, the dotted-line box F6 exists and the dotted-line box F3 also exists.

In one embodiment, the dotted-line box F1 exists, the dotted-line box F6 exists but the dotted-line box F3 does not exist.

In one embodiment, the dotted-line box F1 does not exist, the dotted-line box F6 does not exist, and the dotted-line box F3 does not exist.

In one embodiment, the first node U01 comprises a UE.

In one embodiment, the second node N02 comprises a base station.

In one embodiment, the third node N03 comprises a base station.

In one embodiment, the fourth node N04 comprises a base station.

In one embodiment, the second node N02 comprises a maintenance base station for a serving cell of the first node U01.

In one embodiment, the third node N03 comprises a maintenance base station for a neighboring cell of a serving cell of the first node U01.

In one embodiment, the fourth node N04 comprises a maintenance base station for a neighboring cell of a serving cell of the first node U01.

In one embodiment, the third node N03 and the fourth node N04 are the same.

In one embodiment, the third node N03 and the fourth node N04 are different.

In one embodiment, the second node N02 is the same as at least one of the third node N03 or the fourth node N04.

Embodiment 6

Figure 6:
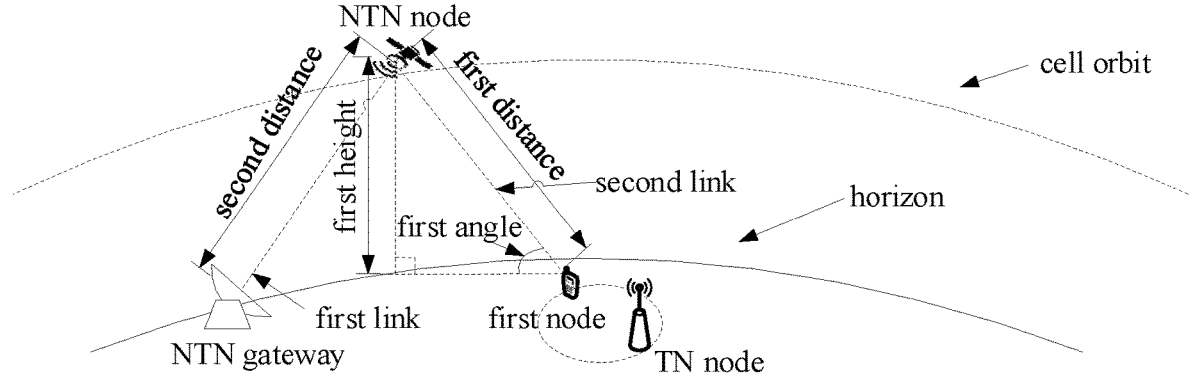
FIG. 6 illustrates a schematic diagram of a cell parameter according to one embodiment of the present disclosure.

Embodiment 6 illustrates a schematic diagram of a cell parameter according to one embodiment of the present disclosure, as shown in FIG. 6.

In one embodiment, a cell parameter is used to determine an order of measurement results in the first message; the cell parameter comprises at least one of a cell type, a cell height, or a cell orbit or a cell delay.

In one embodiment, a maintenance base station for a serving cell of the first node is the NTN node.

In one embodiment, a maintenance base station for the first cell is the NTN node.

In one embodiment, a maintenance base station for the second cell is the NTN node.

In one embodiment, a maintenance base station for a serving cell of the first node is the TN node.

In one embodiment, a maintenance base station for the first cell is the TN node.

In one embodiment, a maintenance base station for the second cell is the TN node.

In one embodiment, a first link comprises a link between the NTN node and an NTN Gateway.

In one embodiment, a second link comprises a link between an NTN node and a first node.

In one embodiment, a first distance comprises a distance between an NTN node and the first node.

In one embodiment, a second distance comprises a distance between an NTN node and an NTN Gateway.

In one embodiment, a first height comprises a vertical distance from an NTN node to the horizon.

In one subembodiment, the horizon comprises an elevation at which the first node is located.

In one subembodiment, the horizon comprises a contour line for an altitude of the first node.

In one embodiment, a first angle comprises an angle formed between a line from the NTN node to the first node and the horizon.

In one subembodiment, the first angle comprises an Angle of Arrival (AOA).

In one subembodiment, the first angle comprises an angle of departure (AOD).

In one embodiment, a uu interface comprises the second link.

In one embodiment, a uu interface comprises the first link and the second link.

In one embodiment, the first link comprises a Feeder Link.

In one embodiment, the second link comprises an access link.

In one embodiment, the NTN comprises using an airborne or space-borne vehicle for carrying networks or network segments of a transmitting or receiving node.

In one embodiment, the NTN node comprises a relay node.

In one embodiment, the NTN node comprises a base station.

In one embodiment, the NTN node comprises a satellite.

In one embodiment, the NTN node comprises a space-borne vehicle carrying payload.

In one embodiment, the NTN node is deployed at a Non-Geostationary Satellite Orbit (NGSO) or a Geostationary Earth Orbit (GEO).

In one embodiment, the NGSO includes a Low-Earth Orbit (LEO).

In one embodiment, the NGSO includes a Medium Earth Orbit (MEO).

In one embodiment, the NTN node is not deployed on the surface of the earth.

In one embodiment, the NTN node carries Transparent Payload.

In one embodiment, the NTN node carries Regenerative Payload.

In one embodiment, the NTN node comprises at least one of Radio Frequency filtering, or Frequency Conversion or Amplification.

In one embodiment, the NTN node comprises at least one of Radio Frequency filtering, or Frequency Conversion or Amplification, or Demodulation, Decoding, Switching or Routing, or Coding, or Modulation.

In one embodiment, the TN node is deployed on the surface of the earth.

In one embodiment, the NTN Gateway comprises an Earth Station or a gateway on the earth.

In one embodiment, the NTN Gateway provides a connection to an NTN base station.

In one embodiment, the NTN Gateway is a Transport Network Layer (TNL) node.

In one embodiment, the NTN Gateway is a base station.

In one embodiment, the cell delay is related to the first distance.

In one embodiment, the cell delay is related to the first distance and light velocity.

In one subembodiment, the cell delay is equal to a quotient of the first distance and the light velocity.

In one subembodiment, the cell delay=the first distance/the light velocity.

In one subembodiment, the cell delay is twice as much as a quotient of the first distance and the light velocity.

In one subembodiment, the cell delay=2*(the first distance/the light velocity).

In one embodiment, the cell delay is related to a sum of the first distance and the second distance.

In one embodiment, the cell delay is related to a sum of the first distance and the second distance as well as light velocity.

In one subembodiment, the cell delay is equal to a quotient of the first distance plus the second distance and the light velocity.

In one subembodiment, the cell delay=(the first distance+the second distance)/the light velocity.

In one subembodiment, the cell delay is twice as much as a quotient of the first distance plus the second distance and the light velocity.

In one subembodiment, the cell delay=2*((the first distance+the second distance)/the light velocity).

In one embodiment, the cell delay comprises common delay.

In one subembodiment, the common delay is related to the first height.

In one subembodiment, the common delay is related to the first height and light velocity.

In one subembodiment, the common delay is equal to a quotient of the first height and light velocity.

In one subembodiment, the common delay=the first height/the light velocity.

In one subembodiment, the common delay is twice as much as a quotient of the first height and the light velocity.

In one subembodiment, the common delay=2*(the first height/the light velocity).

In one subembodiment, the common delay is related to the first height and the second distance.

In one subembodiment, the common delay is related to the first height and the second distance as well as light velocity.

In one subembodiment, the common delay is equal to a quotient of the first height plus the second distance and light velocity.

In one subembodiment, the common delay=(the first height+the second distance)/the light velocity.

In one subembodiment, the common delay is twice as much as a quotient of the first height plus the second distance and the light velocity.

In one subembodiment, the common delay=2*(the first height+the second distance)/the light velocity.

In one embodiment, the cell delay comprises a specific delay for the first node.

In one subembodiment, the specific delay is related to the first height and the first distance.

In one subembodiment, the specific delay is related to the first height and the first distance as well as light velocity.

In one subembodiment, the specific delay is equal to a quotient of the first distance minus the first height and light velocity.

In one subembodiment, the specific delay=(the first distance−the first height)/the light velocity.

In one subembodiment, the specific delay is twice as much as a quotient of the first distance minus the first height and light velocity.

In one subembodiment, the specific delay=2*(the first distance−the first height)/the light velocity.

In one embodiment, the light velocity comprises a traveling speed of light.

In one embodiment, the light velocity comprises 299792458 m/s.

In one embodiment, the light velocity does not exceed 300000000 m/s.

In one embodiment, the cell delay is related to at least one of the first distance, or the first angle, or the first height or the second distance.

In one embodiment, at least one of the first distance, or the first angle, or the first height or the second distance is used to determine the cell delay.

In one embodiment, the cell type includes a cell covered by the NTN node or the TN node.

In one embodiment, an NTN cell includes a cell covered by the NTN node.

In one subembodiment, the type of the NTN cell comprises: NGSO.

In one subembodiment, the type of the NTN cell comprises: GEO.

In one subembodiment, the type of the NTN cell comprises: MEO.

In one subembodiment, the type of the NTN cell comprises: LEO.

In one subembodiment, the type of the NTN cell comprises: HEO.

In one subembodiment, the type of the NTN cell comprises: HAPS.

In one subembodiment, the type of the NTN cell comprises: UAS.

In one embodiment, a TN cell includes a cell covered by the TN node.

In one subembodiment, a maintenance base station for the TN cell is a TN base station.

In one subembodiment, the TN cell includes a Macro Cell.

In one subembodiment, the TN cell includes a Micro Cell.

In one subembodiment, the TN cell includes a Pico Cell.

In one subembodiment, the TN cell includes a Femtocell.

In one embodiment, the cell height comprises a vertical distance from the NTN node to the horizon.

In one embodiment, the cell height comprises the first height.

In one embodiment, the cell height is related to the cell orbit.

In one embodiment, the cell height is related to an elevation of the first node.

In one embodiment, the cell height is related to the cell orbit and an elevation of the first node.

In one embodiment, the cell height comprises a vertical distance from the NTN node to an elevation at which the first node is located.

In one embodiment, the cell orbit comprises an orbit of the NTN node traveling around the earth.

In one embodiment, the cell orbit is used to determine the first height.

In one embodiment, the cell orbit comprises a satellite flying trajectory.

In one embodiment, the cell orbit is related to the Semi-major Axis of Orbit, Eccentricity, Inclination Angle, longitude of ascending node, Argument of Perigee and Perigee passage time.

In one embodiment, the cell parameter comprises at least one of the cell type, the cell height, or the cell orbit, the cell delay, the first distance, the first angle or the second distance.

In one embodiment, the cell height is used to determine the cell type.

In one subembodiment, the cell height being no smaller than a threshold is used to determine that the cell type includes NTN cell.

In one subembodiment, the cell height being no greater than a threshold is used to determine that the cell type includes TN cell.

In one subembodiment, the cell height being no smaller than a threshold and no greater than another threshold is used to determine that the cell type includes NGSO, or GEO, or MEO, or LEO, or HEO, or HAPS or UAS.

In one subembodiment, the threshold is pre-configured.

In one subembodiment, the threshold is configured through an RRC message.

In one subembodiment, the threshold is of a fixed size.

In one embodiment, the cell orbit is used to determine the cell type.

In one subembodiment, the cell orbit includes NGSO.

In one subembodiment, the cell orbit includes GEO.

In one subembodiment, the cell orbit includes MEO.

In one subembodiment, the cell orbit includes LEO.

In one subembodiment, the cell orbit includes HEO.

In one embodiment, the cell delay is used to determine the cell type.

In one subembodiment, the cell delay being no smaller than a given threshold is used to determine that the cell type includes NTN cell.

In one subembodiment, the cell delay being no greater than a given threshold is used to determine that the cell type includes TN cell.

In one subembodiment, the cell delay being no smaller than a given threshold and no greater than a target threshold is used to determine that the cell type includes NGSO, or GEO, or MEO, or LEO, or HEO, or HAPS or UAS platform.

In one subembodiment, at least one of the given threshold or the target threshold is pre-configured.

In one subembodiment, at least one of the given threshold or the target threshold is configured through an RRC message.

In one subembodiment, at least one of the given threshold or the target threshold is of a fixed size.

In one embodiment, the first distance is used to determine the cell type.

In one embodiment, the first angle is used to determine the cell type.

In one embodiment, the second distance is used to determine the cell type.

In one embodiment, the cell ephemeris is used to determine the cell type.

In one embodiment, the first angle is used to determine an order of measurement results in the first message.

In one subembodiment, measurement results in the first message are sorted in a descending order according to the first angle.

In one subembodiment, measurement results in the first message are sorted in an ascending order according to the first angle.

In one embodiment, the cell delay is used to determine an order of measurement results in the first message.

In one subembodiment, measurement results in the first message are sorted in a descending order according to the cell delay.

In one subembodiment, measurement results in the first message are sorted in an ascending order according to the cell delay.

In one embodiment, the cell height is used to determine an order of measurement results in the first message.

In one subembodiment, measurement results in the first message are sorted in a descending order according to the cell height.

In one subembodiment, measurement results in the first message are sorted in an ascending order according to the cell height.

In one embodiment, the cell type is used to determine an order of measurement results in the first message.

In one subembodiment, measurement results in the first message are sorted in a descending order according to a cell priority corresponding to the cell type.

In one subembodiment, measurement results in the first message are sorted in an ascending order according to a cell priority corresponding to the cell type.

In one embodiment, the cell orbit is used to determine an order of measurement results in the first message.

In one subembodiment, measurement results in the first message are sorted in a descending order according to a cell priority corresponding to the cell orbit.

In one subembodiment, measurement results in the first message are sorted in an ascending order according to a cell priority corresponding to the cell orbit.

In one embodiment, the first distance is used to determine an order of measurement results in the first message.

In one subembodiment, measurement results in the first message are sorted in a descending order according to the first distance.

In one subembodiment, measurement results in the first message are sorted in an ascending order according to the first distance.

In one embodiment, the second distance is used to determine an order of measurement results in the first message.

In one subembodiment, measurement results in the first message are sorted in a descending order according to the second distance.

In one subembodiment, measurement results in the first message are sorted in an ascending order according to the second distance.

Embodiment 7

Figure 7:
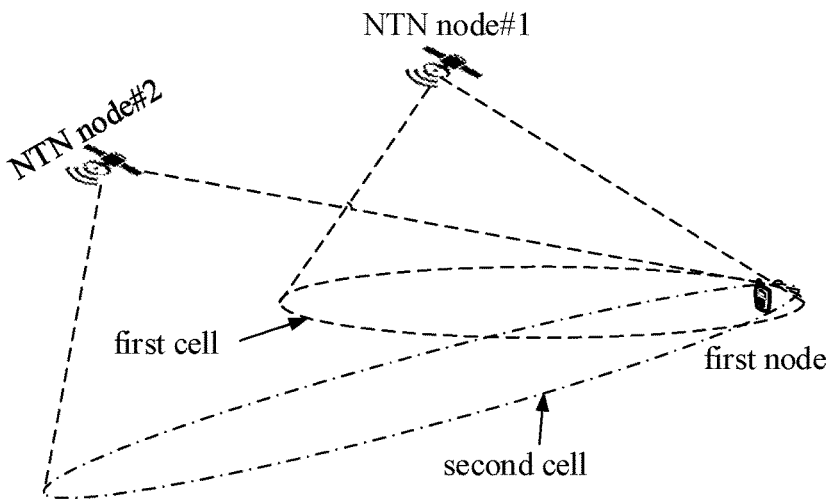
FIG. 7 illustrates a schematic diagram of a first cell and a second cell according to one embodiment of the present disclosure.

Embodiment 7 illustrates a schematic diagram of a first cell and a second cell according to one embodiment of the present disclosure, as shown in FIG. 7. The dashed-line framed ellipse represents a first cell within the coverage of NTN node #1; and the dash-dotted line-framed ellipse represents a second cell within the coverage of NTN node #2.

In one embodiment, the first cell and the second cell are both NTN cells.

In one embodiment, a serving cell of the first node includes an NTN node.

In one embodiment, a serving cell of the first node includes a TN node.

In one embodiment, the NTN node #1 and the NTN node #2 are respectively two different NTN nodes.

In one embodiment, the NTN node #1 and the NTN node #2 are moving in a same orbit.

In one embodiment, the NTN node #1 and the NTN node #2 are moving in different orbits.

In one embodiment, the NTN node #1 and the NTN node #2 are moving in a clockwise direction.

In one embodiment, the NTN node #1 and the NTN node #2 are of a same type.

In one embodiment, the NTN node #1 and the NTN node #2 are of different types.

In one embodiment, the NTN node #1 is used before the NTN node #2 for determining a sequential sorting of the first measurement result and the second measurement result.

In one subembodiment, it is determined according to the cell ephemeris that the NTN node #1 is before the NTN node #2.

In one subembodiment, the phrase of determining that the NTN node #1 is before the NTN node #2 comprises determining that the NTN node #1 appears earlier than the NTN node #2 straightly above the first node.

In one subembodiment, the phrase of determining that the NTN node #1 is before the NTN node #2 comprises determining that the NTN node #1 is located before the NTN node #2 in the clockwise direction.

In one embodiment, the coverage of the second cell being larger than the coverage of the first cell is used to determine a sequential sorting of the second measurement result and the first measurement result.

In one subembodiment, it is determined according to the cell type that the coverage of the second cell is larger than that of the first cell.

In one embodiment, the first angle of the NTN node #1 being larger than the first angle of the NTN node #2 is used to determine a sequential sorting of the second measurement result and the first measurement result.

In one subembodiment, it is determined according to the cell ephemeris that the first angle of the NTN node #1 is larger than that of the NTN node #2.

In one embodiment, the first angle of the NTN node #1 being smaller than the first angle of the NTN node #2 is used to determine a sequential sorting of the second measurement result and the first measurement result.

In one subembodiment, it is determined according to the cell ephemeris that the first angle of the NTN node #1 is smaller than that of the NTN node #2.

Embodiment 8

Figure 8:
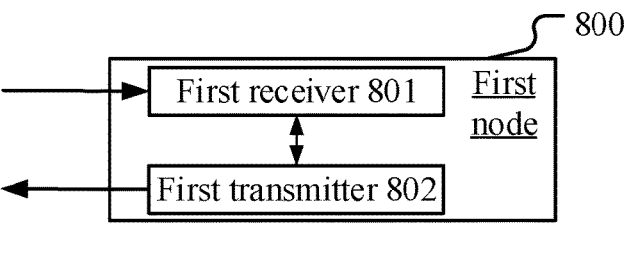
FIG. 8 illustrates a structure block diagram of a processing device used in a first node according to one embodiment of the present disclosure.

FIG. 8 illustrates a structure block diagram of a processing device used in a first node according to one embodiment of the present disclosure; as shown in FIG. 8. In FIG. 8, a processing device 800 in the first node is comprised of a first receiver 801 and a first transmitter 802.

The first receiver 801 performs a first-type measurement, the first-type measurement being used to determine a first measurement result and a second measurement result; and a first transmitter 802 transmits a first message, the first message comprising the first measurement result and the second measurement result.

In Embodiment 8, the first measurement result is associated with a first cell, while the second measurement result is associated with a second cell, the first cell and the second cell are respectively two different cells, and a RAT adopted by the first cell is the same as a RAT adopted by the second cell; the first message comprises a measurement report; at least one of a cell parameter of the first cell or a cell parameter of the second cell is used to determine an order of how the first measurement result and the second measurement result are arranged in the first message; the cell parameter comprises at least one of a cell type, a cell height, or a cell orbit or a cell delay.

In one embodiment, the first receiver 801 receives a first signaling; receives a first reference signal in the first cell, and receiving a second reference signal in the second cell; a measurement for the first reference signal according to a first measurement quantity set is used to determine the first measurement result, while a measurement for the second reference signal according to the first measurement quantity set is used to determine the second measurement result; herein, the first signaling indicates the first measurement quantity set, the first-type measurement being associated with the first measurement quantity set; the first measurement quantity set is used to determine the order of how the first measurement result and the second measurement result are arranged in the first message; the first measurement quantity set is related to signal quality.

In one embodiment, the first receiver 801 receives a first signaling; receives a first reference signal in the first cell, and receiving a second reference signal in the second cell; a measurement for the first reference signal according to a first measurement quantity set is used to determine the first measurement result, while a measurement for the second reference signal according to the first measurement quantity set is used to determine the second measurement result; herein, the first signaling indicates the first measurement quantity set, the first-type measurement being associated with the first measurement quantity set; the first measurement quantity set is related to signal quality.

In one embodiment, the first measurement quantity set is used to determine the order of how the first measurement result and the second measurement result are arranged in the first message.

In one embodiment, the first receiver 801 receives a second signaling; determines first measurement information according to a second measurement quantity set, and determining second measurement information according to the second measurement quantity set; herein, the second signaling indicates the second measurement quantity set, the first-type measurement being associated with the second measurement quantity set; the first measurement information is associated with the first cell, while the second measurement information is associated with the second cell; the second measurement quantity set is used to determine the order of how the first measurement result and the second measurement result are arranged in the first message; the second measurement quantity set is unrelated to signal quality.

In one embodiment, the first receiver 801 receives a second signaling; determines first measurement information according to a second measurement quantity set, and determining second measurement information according to the second measurement quantity set; herein, the second signaling indicates the first measurement quantity set, the first-type measurement being associated with the second measurement quantity set; the first measurement information is associated with the first cell, while the second measurement information is associated with the second cell; the second measurement quantity set is unrelated to signal quality.

In one embodiment, the second measurement quantity set is used to determine the order of how the first measurement result and the second measurement result are arranged in the first message.

In one embodiment, a cell priority is used to determine the order of how the first measurement result and the second measurement result are arranged in the first message; the cell priority is related to the cell parameter.

In one embodiment, the cell parameter of a first serving cell is used to determine the order of how the first measurement result and the second measurement result are arranged in the first message.

In one embodiment, the first receiver 801 receives a third signaling, the third signaling comprising a first threshold, the first threshold being related to the first measurement quantity set; the first measurement result and the second measurement result fulfill the first threshold.

In one embodiment, the first receiver 801 receives a fourth signaling, the fourth signaling comprising a second threshold, the second threshold being related to the second measurement quantity set; the first measurement result and the second measurement result fulfill the second threshold.

In one embodiment, the first transmitter 802 transmits a second message, the second message being used to indicate the cell priority, and the second message comprising an RRC message.

In one embodiment, the first receiver 801 comprises the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 801 comprises the antenna 452, the receiver 454, the multi-antenna receiving processor 458 and the receiving processor 456 in FIG. 4 of the present disclosure.

In one embodiment, the first receiver 801 comprises the antenna 452, the receiver 454 and the receiving processor 456 in FIG. 4 of the present disclosure.

In one embodiment, the first transmitter 802 comprises the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 802 comprises the antenna 452, the transmitter 454, the multi-antenna transmitting processor 457 and the transmitting processor 468 in FIG. 4 of the present disclosure.

In one embodiment, the first transmitter 802 comprises the antenna 452, the transmitter 454 and the transmitting processor 468 in FIG. 4 of the present disclosure.

Embodiment 9

Figures 9, 10:
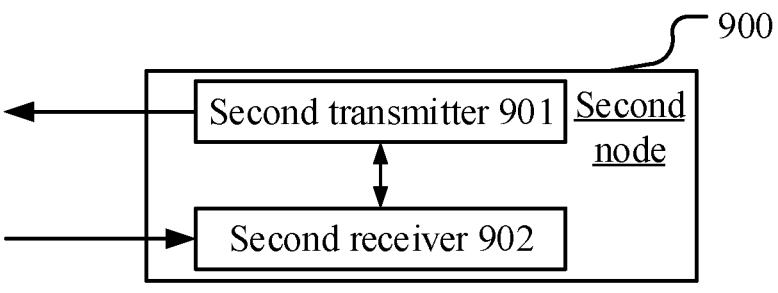
FIG. 9 illustrates a structure block diagram of a processing device used in a second node according to one embodiment of the present disclosure.
FIG. 10 illustrates a schematic diagram of a first message according to one embodiment of the present disclosure.

FIG. 9 illustrates a structure block diagram of a processing device used in a second node according to one embodiment of the present disclosure; as shown in FIG. 9. In FIG. 9, a processing device 900 in the second node is comprised of a second transmitter 901 and a second receiver 902.

The second receiver 902 receives a first message, the first message comprising a first measurement result and a second measurement result.

In Embodiment 9, a first-type measurement is performed, the first-type measurement being used to determine the first measurement result and the second measurement result; the first measurement result is associated with a first cell, while the second measurement result is associated with a second cell, the first cell and the second cell are respectively two different cells, and a RAT adopted by the first cell is the same as a RAT adopted by the second cell; the first message comprises a measurement report; at least one of a cell parameter of the first cell or a cell parameter of the second cell is used to determine an order of how the first measurement result and the second measurement result are arranged in the first message; the cell parameter comprises at least one of a cell type, a cell height, or a cell orbit or a cell delay.

In one embodiment, the second transmitter 901 transmits a first signaling; herein, a first reference signal is received in the first cell, while a second reference signal is received in the second cell; a measurement for the first reference signal according to a first measurement quantity set is used to determine the first measurement result, while a measurement for the second reference signal according to the first measurement quantity set is used to determine the second measurement result; the first signaling indicates the first measurement quantity set, the first-type measurement being associated with the first measurement quantity set; the first measurement quantity set is used to determine the order of how the first measurement result and the second measurement result are arranged in the first message; the first measurement quantity set is related to signal quality.

In one embodiment, the first reference signal is received by the first node in the present disclosure; and the first reference signal is transmitted by the third node in the present disclosure.

In one embodiment, the second reference signal is received by the first node in the present disclosure; and the second reference signal is transmitted by the fourth node in the present disclosure.

In one embodiment, the second transmitter 901 transmits a first signaling; herein, a first reference signal is received in the first cell, while a second reference signal is received in the second cell; a measurement for the first reference signal according to a first measurement quantity set is used to determine the first measurement result, while a measurement for the second reference signal according to the first measurement quantity set is used to determine the second measurement result; the first signaling indicates the first measurement quantity set, the first-type measurement being associated with the first measurement quantity set; the first measurement quantity set is related to signal quality.

In one embodiment, the first measurement quantity set is used to determine the order of how the first measurement result and the second measurement result are arranged in the first message.

In one embodiment, the second transmitter 901 transmits a second signaling; herein, according to a second measurement quantity set first measurement information is determined, and according to a second measurement quantity set second measurement information is determined; the second signaling indicates the second measurement quantity set, the first-type measurement being associated with the second measurement quantity set; the first measurement information is associated with the first cell, while the second measurement information is associated with the second cell; the second measurement quantity set is used to determine the order of how the first measurement result and the second measurement result are arranged in the first message; the second measurement quantity set is unrelated to signal quality.

In one embodiment, the first measurement information is determined by the first node in the present disclosure.

In one embodiment, the second measurement information is determined by the first node in the present disclosure.

In one embodiment, the second transmitter 901 transmits a second signaling; herein, according to a second measurement quantity set first measurement information is determined, and according to a second measurement quantity set second measurement information is determined; the second signaling indicates the second measurement quantity set, the first-type measurement being associated with the second measurement quantity set; the first measurement information is associated with the first cell, while the second measurement information is associated with the second cell; the second measurement quantity set is unrelated to signal quality.

In one embodiment, the second measurement quantity set is used to determine the order of how the first measurement result and the second measurement result are arranged in the first message.

In one embodiment, a cell priority is used to determine the order of how the first measurement result and the second measurement result are arranged in the first message; the cell priority is related to the cell parameter.

In one embodiment, the cell parameter of a first serving cell is used to determine the order of how the first measurement result and the second measurement result are arranged in the first message.

In one embodiment, the second transmitter 901 transmits a third signaling, the third signaling comprising a first threshold, the first threshold being related to the first measurement quantity set; the first measurement result and the second measurement result fulfill the first threshold.

In one embodiment, the second transmitter 901 transmits a fourth signaling, the fourth signaling comprising a second threshold, the second threshold being related to the second measurement quantity set; the first measurement result and the second measurement result fulfill the second threshold.

In one embodiment, the second receiver 902 receives a second message, the second message being used to indicate the cell priority, and the second message comprising an RRC message.

In one embodiment, the second transmitter 901 comprises the antenna 420, the transmitter 418, the multi-antenna transmitting processor 471, the transmitting processor 416, the controller/processor 475 and the memory 476 in FIG. 4 of the present disclosure.

In one embodiment, the second transmitter 901 comprises the antenna 420, the transmitter 418, the multi-antenna transmitting processor 471 and the transmitting processor 416 in FIG. 4 of the present disclosure.

In one embodiment, the second transmitter 901 comprises the antenna 420, the transmitter 418 and the transmitting processor 416 in FIG. 4 of the present disclosure.

In one embodiment, the second receiver 902 comprises the antenna 420, the receiver 418, the multi-antenna receiving processor 472, the receiving processor 470, the controller/processor 475 and the memory 476 in FIG. 4 of the present disclosure.

In one embodiment, the second receiver 902 comprises the antenna 420, the receiver 418, the multi-antenna receiving processor 472 and the receiving processor 470 in FIG. 4 of the present disclosure.

In one embodiment, the second receiver 902 comprises the antenna 420, the receiver 418 and the receiving processor 470 in FIG. 4 of the present disclosure.

Embodiment 10

Embodiment 10 illustrates a schematic diagram of a first message according to one embodiment of the present disclosure, as shown in FIG. 10. In FIG. 10, the ellipsis denotes other fields or IEs.

In Embodiment 10, the first message comprises a first list and a second list, with the first list comprising the first measurement result and the second list comprising the second measurement result; the cell parameter of the first cell is different from the cell parameter of the second cell.

In one embodiment, the -- ASN1START denotes a start of an ASN message.

In one embodiment, the -- TAG- third information set -START denotes a start of a third information set message.

In one embodiment, the -- TAG- third information set -STOP denotes an end of a third information set message.

In one embodiment, the -- ASN1STOP denotes an end of an ASN message.

In one embodiment, the first structural type comprises SEQUENCE.

In one embodiment, the first structural type comprises CHOICE.

In one embodiment, the first list comprises measurement results of NTN, and the second list comprises measurement results of TN.

In one embodiment, the first list comprises a cell identifier of the first cell, and the second list comprises a cell identifier of the second cell.

In one embodiment, the first list is different from the second list.

In one embodiment, the cell parameter comprises the cell type.

In one embodiment, the cell parameter of the first cell indicates that the first cell is an NTN cell; the cell parameter of the second cell indicates that the second cell is a TN cell.

In one embodiment, the first list is a field in the first message, and names of the field include at least one of Meas, or Result, or List, or NTN, or NR or EUTRA.

In one embodiment, the first list is a field in the first message, and names of the field include at least one of MeasResultListNR, or MeasResultListEUTRA, or MeasResultListUTRA-FDD, or MeasResultServMOList, or MeasResultsSL, or MeasResultListNTN, or MeasResultListNR-NTN or MeasResultListEUTRA-NTN.

In one embodiment, the second list is a field in the first message, and names of the field include at least one of MeasResultListNR, or MeasResultListEUTRA, or MeasResultListUTRA-FDD, or MeasResultServMOList or MeasResultsSL.

In one embodiment, values in the first list include at least one of a cell identifier of the first cell, or a cell identifier of the serving cell, or the first measurement result or the first measurement information.

In one subembodiment, the cell identifier of the first cell includes a PhysCellId.

In one subembodiment, the cell identifier of the serving cell includes a ServCellIndex.

In one subembodiment, the first measurement result comprises at least one of MeasResultNR, or MeasQuantityResults, RSRP-Range, or RSRQ-Range, or SINR-Range, or RSRP-RangeEUTRA, or RSRQ-RangeEUTRA, or SINR-RangeEUTRA, or MeasResultNTN, or RSRP-RangeNTN, or RSRQ-RangeNTN or SINR-RangeNTN.

In one embodiment, values in the second list include at least one of a cell identifier of the second cell, or a cell identifier of the serving cell, or the second measurement result.

In one subembodiment, the cell identifier of the first cell includes a PhysCellId.

In one subembodiment, the cell identifier of the serving cell includes a ServCellIndex.

In one subembodiment, the first measurement result comprises at least one of MeasResultNR, or MeasQuantityResults, RSRP-Range, or RSRQ-Range, or SINR-Range, or RSRP-RangeEUTRA, or RSRQ-RangeEUTRA, or SINR-RangeEUTRA.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A user equipment (UE) for wireless communications, comprising:
a first receiver, operative to receive and measure signals used to determine a time measurement of a service non-terrestrial network (NTN) cell and a time measurement of one or more adjacent NTN cells and a position measurement of the UE;
a first transmitter, operative to transmit a first message to the service NTN cell, the first message comprising the time measurement and the position measurement; and
a processor configured to determine whether to switch from the service NTN cell to an adjacent NTN cell based on the time measurements and the position measurement, wherein there are a plurality of adjacent NTN cells and a time measurement for each NTN cell, wherein the first message includes each NTN cell arranged according to a cell priority related to a cell parameter.

2. The UE according to claim 1, wherein the cell parameter is based on a characteristic of each of the plurality of adjacent NTN cells.

3. The UE according to claim 1, comprising:
the first receiver, receiving a first threshold related to the time measurements.

4. The UE according to claim 1, comprising:
the first receiver, receiving a second threshold related to the position measurement.

5. A second node for wireless communications, comprising:
a second receiver, receiving a first message, the first message comprising a first measurement result and a second measurement result;
a second transmitter, transmitting a first signaling;
wherein a first-type measurement is performed, the first-type measurement being used to determine the first measurement result and the second measurement result; the first measurement result is associated with a first cell, while the second measurement result is associated with a second cell, the first cell and the second cell are respectively two different cells, and a RAT adopted by the first cell is the same as a RAT adopted by the second cell; the first message comprises a measurement report; at least one of a cell parameter of the first cell or a cell parameter of the second cell is used to determine an order of how the first measurement result and the second measurement result are arranged in the first message; the cell parameter comprises at least one of a cell type, a cell height, or a cell orbit or a cell delay wherein a first reference signal is received in the first cell, while a second reference signal is received in the second cell: a measurement for the first reference signal according to a first measurement quantity set is used to determine the first measurement result, while a measurement for the second reference signal according to the first measurement quantity set is used to determine the second measurement result; the first signaling indicates the first measurement quantity set, the first-type measurement being associated with the first measurement quantity set; the first measurement quantity set is used to determine the order of how the first measurement result and the second measurement result are arranged in the first message; the first measurement quantity set is related to signal quality.

6. The second node according to claim 5, comprising:
the second transmitter, transmitting a second signaling;
wherein according to a second measurement quantity set first measurement information is determined, and according to a second measurement quantity set second measurement information is determined; the second signaling indicates the second measurement quantity set, the first-type measurement being associated with the second measurement quantity set; the first measurement information is associated with the first cell, while the second measurement information is associated with the second cell; the second measurement quantity set is used to determine the order of how the first measurement result and the second measurement result are arranged in the first message; the second measurement quantity set is unrelated to signal quality.

7. The second node according to claim 6, comprising:

the second transmitter, transmitting a fourth signaling, the fourth signaling comprising a second threshold, the second threshold being related to the second measurement quantity set;

the first measurement result and the second measurement result fulfill the second threshold.

8. The second node according to claim 5, wherein a cell priority is used to determine the order of how the first measurement result and the second measurement result are arranged in the first message; the cell priority is related to the cell parameter.

9. The second node according to claim 8, comprising:

the second receiver, receiving a second message, the second message being used to indicate the cell priority, and the second message comprising an RRC message.

10. The second node according to claim 5, wherein the cell parameter of a first serving cell is used to determine the order of how the first measurement result and the second measurement result are arranged in the first message.

11. The second node according to claim 5 comprising:

the second transmitter, transmitting a third signaling, the third signaling comprising a first threshold, the first threshold being related to the first measurement quantity set; the first measurement result and the second measurement result fulfill the first threshold.

12. The second node according to claim 5, wherein the first message comprises a first list and a second list, the first list comprises the first measurement result, and the second list comprises the second measurement result; the cell parameter of the first cell is different from the cell parameter of the second cell.

13. A method in a first node for wireless communications, comprising:

performing a first-type measurement, the first-type measurement being used to determine a first measurement result and a second measurement result; and transmitting a first message, the first message comprising the first measurement result and the second measurement result;

receiving a first signaling; receiving a first reference signal in the first cell, and receiving a second reference signal in the second cell; a measurement for the first reference signal according to a first measurement quantity set is used to determine the first measurement result, while a measurement for the second reference signal according to the first measurement quantity set is used to determine the second measurement result;

wherein the first measurement result is associated with a first cell, while the second measurement result is associated with a second cell, the first cell and the second cell are respectively two different cells, and a RAT adopted by the first cell is the same as a RAT adopted by the second cell; the first message comprises a measurement report; at least one of a cell parameter of the first cell or a cell parameter of the second cell is used to determine an order of how the first measurement result and the second measurement result are arranged in the first message; the cell parameter comprises at least one of a cell type, a cell height, or a cell orbit or a cell delay;

wherein the first signaling indicates the first measurement quantity set, the first-type measurement being associated with the first measurement quantity set; the first measurement quantity set is used to determine the order of how the first measurement result and the second measurement result are arranged in the first message; the first measurement quantity set is related to signal quality.

14. A method in a second node for wireless communications, comprising:

receiving a first message, the first message comprising a first measurement result and a second measurement result;

transmitting a first signaling;

wherein a first-type measurement is performed, the first-type measurement being used to determine the first measurement result and the second measurement result; the first measurement result is associated with a first cell, while the second measurement result is associated with a second cell, the first cell and the second cell are respectively two different cells, and a RAT adopted by the first cell is the same as a RAT adopted by the second cell; the first message comprises a measurement report; at least one of a cell parameter of the first cell or a cell parameter of the second cell is used to determine an order of how the first measurement result and the second measurement result are arranged in the first message; the cell parameter comprises at least one of a cell type, a cell height, or a cell orbit or a cell delay wherein a first reference signal is received in the first cell, while a second reference signal is received in the second cell; a measurement for the first reference signal according to a first measurement quantity set is used to determine the first measurement result, while a measurement for the second reference signal according to the first measurement quantity set is used to determine the second measurement result; the first signaling indicates the first measurement quantity set, the first-type measurement being associated with the first measurement quantity set, the first measurement quantity set is used to determine the order of how the first measurement result and the second first message: the first measurement quantity set is related to signal quality.

* * * * *